US010506538B2

(12) United States Patent
Dai et al.

(10) Patent No.: US 10,506,538 B2
(45) Date of Patent: Dec. 10, 2019

(54) METHOD AND APPARATUS FOR CONFIGURING POSITION OF FREQUENCY RESOURCE

(71) Applicant: Huawei Technologies Co., Ltd., Shenzhen, Guangdong (CN)

(72) Inventors: Xizeng Dai, Beijing (CN); Xiaoan Fan, Beijing (CN); Jie Cui, Shenzhen (CN); Juan Zheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 15/271,018

(22) Filed: Sep. 20, 2016

(65) Prior Publication Data

US 2017/0013581 A1   Jan. 12, 2017

Related U.S. Application Data

(63) Continuation of application No. PCT/CN2014/073898, filed on Mar. 21, 2014.

(51) Int. Cl.
*H04W 56/00* (2009.01)
*H04W 72/04* (2009.01)
(Continued)

(52) U.S. Cl.
CPC ....... *H04W 56/0025* (2013.01); *H04L 5/0005* (2013.01); *H04L 5/0044* (2013.01);
(Continued)

(58) Field of Classification Search
CPC ............. H04W 56/0025; H04W 8/005; H04W 72/0453; H04W 88/02; H04W 56/00;
(Continued)

(56) References Cited

U.S. PATENT DOCUMENTS

2008/0014886 A1*  1/2008  Lee ................... H04W 56/0085
                                                   455/187.1
2008/0084849 A1    4/2008  Wang et al.
                           (Continued)

FOREIGN PATENT DOCUMENTS

CN       101959180 A      1/2011
CN       102281639 A     12/2011
                           (Continued)

OTHER PUBLICATIONS

"Discussion on Network Listening for Inter-Operator TDD Deployment," 3GPP TSG RAN WG1 Meeting #76, Huawei, HiSilicon, CATR, R1-140206, Prague, Czech Republic, Feb. 10-14, 2014, 3 pages.

(Continued)

*Primary Examiner* — Ivan O Latorre
(74) *Attorney, Agent, or Firm* — Leydig, Voit & Mayer, Ltd.

(57) ABSTRACT

A method and an apparatus are used to configure a position of a transmission frequency resource according to a synchronization relationship between devices, includes: adjusting, by a first device, synchronization according to synchronization information of a second device, in a case in which the first device is synchronous with the second device, or the second device can adjust a configured frequency resource, configuring a frequency resource close to an edge of a frequency band, where the frequency resource is used to transmit data, and notifying first user equipment; in a case in which the devices are synchronous, adjusting, by the first device and the second device, a start moment or an end moment of transmitting or receiving a signal; and using, by the first device in a manner of extending a bandwidth of a carrier frequency or a manner of carrier aggregation.

15 Claims, 10 Drawing Sheets

(51) Int. Cl.
*H04L 5/00* (2006.01)
*H04L 5/14* (2006.01)
*H04W 8/00* (2009.01)
*H04W 88/02* (2009.01)

(52) U.S. Cl.
CPC .............. *H04L 5/14* (2013.01); *H04L 5/1469* (2013.01); *H04W 8/005* (2013.01); *H04W 72/0453* (2013.01); *H04W 56/00* (2013.01); *H04W 88/02* (2013.01)

(58) Field of Classification Search
CPC ....... H04L 5/1469; H04L 5/14; H04L 5/0005; H04L 5/0044
See application file for complete search history.

(56) References Cited

U.S. PATENT DOCUMENTS

| | | | | |
|---|---|---|---|---|
| 2008/0247375 | A1* | 10/2008 | Muharemovic | H04W 72/0426 370/344 |
| 2012/0014312 | A1* | 1/2012 | Zhang | H04W 56/00 370/312 |
| 2012/0257519 | A1* | 10/2012 | Frank | H04L 5/0035 370/252 |
| 2012/0258724 | A1* | 10/2012 | Kim | H04W 72/082 455/452.2 |
| 2013/0260763 | A1* | 10/2013 | Bhattad | H04W 36/0088 455/436 |
| 2014/0211782 | A1* | 7/2014 | Yamaguchi | H04W 56/0015 370/350 |
| 2015/0011236 | A1* | 1/2015 | Kazmi | H04W 52/365 455/456.1 |
| 2015/0071203 | A1* | 3/2015 | Lee | H04W 72/08 370/329 |
| 2015/0087352 | A1* | 3/2015 | Lim | H04W 72/0453 455/522 |
| 2015/0117437 | A1* | 4/2015 | Abedini | H04W 56/0025 370/350 |
| 2015/0200758 | A1* | 7/2015 | Wakabayashi | H04L 5/0041 370/329 |
| 2015/0281974 | A1* | 10/2015 | Ghasemzadeh | H04W 16/14 455/454 |
| 2017/0013576 | A1* | 1/2017 | Jung | H04W 76/14 |

FOREIGN PATENT DOCUMENTS

| | | | | |
|---|---|---|---|---|
| CN | 102547967 A | | 7/2012 | |
| CN | 103476104 A | | 12/2013 | |
| WO | WO 2011/032457 | * | 3/2011 | ............ H04W 36/06 |

OTHER PUBLICATIONS

"On the Support of Multiple Stratum Levels in Networking Listening," 3GPP TSG RAN WG1 Meeting #76, Huawei, HiSilicon, R1-140040, Prague, Czech Republic, Feb. 10-14, 2014, 3 pages.

CMCC; "Discussion on intra-operator and inter-operator synchronization for small cell enhancement"; R1-140594; Prague, Czech Republic; Feb. 10-14, 2014; 8 pages.

* cited by examiner

METHOD AND APPARATUS FOR CONFIGURING POSITION OF FREQUENCY RESOURCE

CROSS-REFERENCE TO RELATED APPLICATIONS

This application is a continuation of International Application No. PCT/CN2014/073898, filed on Mar. 21, 2014, the disclosure of which is hereby incorporated by reference in its entirety.

TECHNICAL FIELD

The present invention relates to the field of communications technologies, and in particular, to a method and an apparatus for configuring a position of a transmission frequency resource.

BACKGROUND

The Long Term Evolution (LTE) project is evolution of a system of The Third Generation Telecommunication (T3G), improves and enhances a radio access technology of 3G, and uses an orthogonal frequency division multiplexing (OFDM) technology and multiple input multiple output (MIMO).

In the evolution of an LTE system, an important technology is use of a Small Cell (Small Cell). A network formed of Small Cells may greatly improve a system capacity. A Small cell technology has a relatively high requirement for synchronization between networks. Not only synchronization between base stations inside an operator network is required, but also relatively desirable synchronization between networks of different operators is also required. Synchronization includes time synchronization and frequency synchronization. Network synchronization between different operators that uses a time division duplex (TDD) technology helps to reduce frequency guard space required between different frequency bands, so as to increase frequency resources that can be used for transmission.

Frequency guard space refers to a particular frequency guard interval set between adjacent frequency bands used by operators. The spectral band is not used to transmit data and is only used to increase an interval between two adjacent frequency bands to reduce mutual interference between the adjacent frequency bands. Generally, according to research involving spectrums, a guard interval between 5 MHz and 20 MHz usually needs to be set between adjacent TDD frequency bands, to avoid interference between different frequency band signals.

Specifically, for a TDD system, such interference is mainly interference to downlink reception from uplink transmission. For example, user equipment of an operator A and another user equipment of an operator B are relatively close. In this case, if networks of the two operators are asynchronous, and when the user equipment of A is transmitting an uplink signal, the user equipment of B is receiving downlink data, and if a frequency interval between two frequency bands is excessively small, a case in which signal transmission of A interferes with reception of downlink data of B occurs. To avoid such mutual interference, during design of frequency bands, a part of spectrum is reserved as frequency guard space. The frequency guard space is not used for service transmission, and is only used to increase a frequency interval between an interference signal and a system that is interfered with, to achieve a guarding effect.

The foregoing discussion is continued. If transmission of A and reception of B can always take place alternately, an uplink of A always corresponds to an uplink of B, and a downlink of A always corresponds to a downlink of B. In this case, interference between systems of A and B may be avoided, and therefore frequency guard space may be omitted or only relatively small frequency guard space needs to be used. Such alternation in time may be implemented by means of synchronization between the networks of A and B. In this way, frequency guard space that is originally used for guarding may be used for data transmission, so that spectral efficiency and a system capacity can be improved.

Therefore, it is necessary to provide a solution to perform synchronization between different operator networks, so as to reduce frequency guard space by means of synchronization.

SUMMARY

Embodiments of the present invention provide a method and an apparatus that effectively reduce frequency guard space. By means of the method, a time division duplex (Time Division Duplex) device can autonomously use synchronization between devices to reduce frequency guard space and effectively use the frequency guard space without complex communication and coordination between networks.

To achieve the foregoing objective, the following technical solutions are provided in the embodiments of the present invention:

According to a first aspect, a method for configuring a position of a transmission frequency resource is provided, including:

configuring, by a first device according to synchronization information of a second device, a position of a frequency resource used to transmit data.

Assuming that at least one device of the first device or the second device uses a time division duplex technology, where the time division duplex technology refers to that uplink transmission (or reception) and downlink reception (or transmission) of devices are performed at different times and do not overlap in time, but use a same frequency resource, where in the present invention, an uplink refers to a transmission link from first user equipment to the first device, and a downlink refers to a transmission link from the first device to the first user equipment.

Assuming that frequency bands of the first device and the second device are adjacent, where that frequency bands are adjacent refers to that a frequency band that can be used by the first device and a frequency band used by the second device have an adjacent relationship in a frequency domain. For example, a frequency band 35 (1850 MHz to 1910 MHz) and a frequency band 37 (1910 MHz to 1930 MHz) are adjacent in a frequency domain, and a frequency band 42 (3400 MHz to 3600 MHz) and a frequency band 43 (3600 MHz to 3800 MHz) are adjacent in a frequency domain;

the first device acquires the synchronization information of the second device;

the first device determines a synchronization status between the first device and the second device according to the synchronization information of the second device;

the synchronization information of the second device includes but is not limited to: timing information of the second device, that is, information related to a start moment or an end moment of a symbol or a subframe or a timeslot or a frame or a superframe of the second device; or indication information for at least one of the following synchronization statuses: whether a device is synchronous with a preset time, or whether clock synchronization of a device is reliable, or whether clock synchronization of a device is directly from clock synchronization of a wired network, or whether clock synchronization of a device is from reliable network listening, or whether a level of clock synchronization of a device is less than a set threshold, or whether precision of clock synchronization of a device is greater than a set threshold;

the synchronization information further includes a center carrier frequency position, acquired by the first device, of a frequency resource that is configured by the second device and that is used for transmission; and the first device performs determining according to the foregoing synchronization information, adjusts a synchronization relationship between the first device and the second device, and sets a synchronization status of the first device; and configures a frequency resource close to an edge of a frequency band, where the frequency resource is used to transmit data.

With reference to the first aspect, in a first possible implementation manner, a specific method for the first device to adjust a synchronization relationship between the first device and the second device and configure a frequency resource close to an edge of a frequency band is as follows:

When the second device is synchronous with a preset clock, or a clock of the second device is reliable, or a clock of the second device is directly from time synchronization of a wired network, or a clock of the second device is from reliable network listening, or a level of clock synchronization of the second device is less than a set threshold, or precision of clock synchronization of the second device is greater than a set threshold, adjusting, by the first device, a time of the first device according to a time of the second device, to make the time of the first device synchronous with the time of the second device; and adjusting the synchronization status of the first device; and in a case in which the first device is synchronous with the second device, configuring, by the first device, a frequency resource close to an edge of a frequency band (an edge of a frequency band adjacent to the second device), that is, canceling or reducing frequency guard space used by the first device before synchronization is adjusted, and correspondingly adjusting a frequency resource used by the first device to perform data communication, where a specific description is as follows:

Assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1=|F_1-F_B|$, where $F_1$ is characterized in that: assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and a value of $F_1$ makes $G_1$ meet a condition $G_1<G_a$; and after the configuring, by the first device, a frequency resource close to an edge of a frequency band (an edge of a frequency band adjacent to the second device), that is, canceling or reducing frequency guard space used by the first device before synchronization is adjusted, a maximum level of spurious emission of a signal of the first device is $L_1$, where a value of $L_1$ is characterized in that:

$L_1>L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$.

In the 3GPP standards, strength of an out-of-band emission signal is measured by using a level of spurious emission (Spurious emission band UE co-existence). Spurious emission is mainly leakage of signal energy outside a frequency bandwidth used by a device, where the leakage is caused by nonlinearity and cross-modulation/intermodulation of radio frequency components of devices. In the standards, it is required that a level of spurious emission should not exceed a maximum value inside a particular measurement bandwidth at an edge of a frequency band used by a device. Therefore, interference from out-of-band emission of a device to a device located at an adjacent frequency band is limited. A level of spurious emission is limited, that is, a device is indirectly required to reserve particular guard space inside guard space.

Currently, spurious emission specified in the 3GPP standards is defined in a condition in which it is assumed that time division duplex devices in adjacent frequency bands are asynchronous, for example, as shown in the following table:

| | | Level of spurious emission | | | |
|---|---|---|---|---|---|
| Frequency band | Guarded frequency band | Frequency range (MHz) | Maximum spurious level | Measurement bandwidth | Note |
| 38 | E-UTRA Band 1, 2, 3, 4, 5, 8, 10, 12, 13, 14, 17, 20, 22, 27, 28, 29, 30, 31, 33, 34, 40, 42, 43 | FDL_low-FDL_high | −50 | 1 | |
| | Frequency range | 2620-2645 | −15.5 | 5 | 15, 22, 26 |
| | Frequency range | 2645-2690 | −40 | 1 | 15, 22 |
| 39 | E-UTRA Band 22, 34, 40, 41, 42, 44 | FDL_low-FDL_high | −50 | 1 | |
| | Frequency range | 1805 1855 | [−40] | 1 | 32 |
| | Frequency range | 1855 1875 | [−15.5] | 5 | 15, 26, 32 |
| | Frequency range | 1875 1880 | [−15.5] | 5 | 15, 26, 33 |
| 40 | E-UTRA Band 1, 3, 5, 7, 8, 20, 22, 26, 27, 33, 34, 38, 39, 41, 42, 43, 44 | FDL_low-FDL_high | −50 | 1 | |

-continued

| Frequency band | Guarded frequency band | Level of spurious emission | | | Note |
|---|---|---|---|---|---|
| | | Frequency range (MHz) | Maximum spurious level | Measurement bandwidth | |
| 41 | E-UTRA Band 1, 2, 3, 4, 5, 8, 10, 12, 13, 14, 17, 23, 24, 25, 26, 27, 28, 29, 30, 34, 39, 40, 42, 44 | FDL_low-FDL_high | −50 | 1 | |
| | E-UTRA Band 9, 11, 18, 19, 21 | FDL_low-FDL_high | −50 | 1 | 30 |
| | Frequency range | 1839.9 1879.9 | −50 | 1 | 30 |
| | Frequency range | 1884.5 1915.7 | −41 | 0.3 | 8, 30 |
| 42 | E-UTRA Band 1, 2, 3, 4, 5, 7, 8, 10, 20, 25, 26, 27, 28, 31, 33, 34, 38, 40, 41, 44 | FDL_low-FDL_high | −50 | 1 | |
| | E-UTRA Band 43 | FDL_low-FDL_high | −50 | 1 | 3 |
| 43 | E-UTRA Band 1, 2, 3, 4, 5, 7, 8, 10, 20, 25, 26, 27, 28, 33, 34, 38, 40 | FDL_low-FDL_high | −50 | 1 | |
| | E-UTRA Band 42 | FDL_low-FDL_high | −50 | 1 | 3 |
| | E-UTRA Band 22 | FDL_low-FDL_high | [−50] | [1] | 3 |
| 44 | E-UTRA Band 3, 5, 8, 34, 39, 41 | FDL_low-FDL_high | −50 | 1 | |
| | E-UTRA Band 1, 40, 42 | FDL_low-FDL_high | | −50 | 2 |

The foregoing description is applicable to explanation regarding a level of spurious emission in other parts in the present invention.

A general effect achieved by the method is that the first device and the second device reach synchronization and frequency guard space between the first device and the second device is reduced, so that in a case of synchronization between devices, levels of spurious emission of devices in time division duplex frequency bands may be extended, that is, a maximum spurious level may be increased.

The effect of reducing a guard bandwidth described above is applicable to a same condition and scenario in another part of the present invention.

With reference to the first aspect, in a second possible implementation manner, a specific method for the first device to adjust the synchronization relationship between the first device and the second device and configure the frequency resource close to the edge of the frequency band is as follows:

After the first device performs determining according to the clock synchronization information of the second device, in a case in which the first device determines not to adjust a clock of the first device to be synchronous with the second device, and when the second device can configure, according to the frequency resource configured by the first device, a frequency resource used to transmit data by the second device, by means of coordination between the first device and the second device, the first device configures a frequency resource close to an edge of a frequency band (an edge of a frequency band adjacent to the second device), that is, cancels or reduces frequency guard space used by the first device before synchronization is adjusted, and correspondingly adjusts a frequency resource used by the first device to perform data communication, where a specific description is as follows:

Assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1=|F_1-F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and a value of $F_1$ makes $G_1$ meet a condition $G_1<G_a$; and after the configuring, by the first device, a frequency resource close to an edge of a frequency band (an edge of a frequency band adjacent to the second device), that is, canceling or reducing frequency guard space used by the first device before synchronization is adjusted, a maximum level of spurious emission of a signal of the first device is $L_1$, where a value of $L_1$ is characterized in that:

$L_1>L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$.

After coordination between the second device and the first device, the second device releases frequency guard space of the second device.

A general effect achieved by the foregoing method is that the first device and the second device do not need to maintain time synchronization, and frequency guard space between the first device and the second device are kept unchanged; and the first device cancels or reduces frequency guard space, and the second device correspondingly increases frequency guard space.

With reference to the first aspect, in a third possible implementation manner, a method for the first device to acquire the timing information of the second device or information about the center carrier frequency position of the second device includes:

searching for and receiving, by the first device, a synchronization reference signal sent by the second device, and processing the reference signal, to obtain the synchronization information; or receiving, by the first device in a wired manner, a signal sent by the second device to obtain the synchronization information; or obtaining, by the first device, the timing information of the second device or information about a center frequency position of the second device by using a center controller.

With reference to the first aspect and the first possible implementation manner, in a fourth possible implementation manner, the synchronization status, of the first device, synchronously set by the first device according to a time of the second device includes, but is not limited to:

a clock of the first device is synchronous with a preset time, or clock synchronization of the first device is reliable, or a clock of the first device is from reliable network listening, or a level of clock synchronization of the first device is less than a set threshold, or precision of clock synchronization of the first device is greater than a set threshold, where the synchronization status is feature information of a device, is stored on the first device or the second device, may be transferred between devices, and is used to indicate a feature or status of a device.

With reference to the first aspect and the first possible implementation manner, in a fifth possible implementation manner, after the first device adjusts the configured frequency resource according to the synchronization information of the second device, when the first device and the second device both use the time division duplex technology, the first device and the second device use a same uplink-downlink subframe configuration, where the uplink-downlink subframe configuration is a quantity of uplink subframes used within one frame and which subframes are specifically configured as uplink subframes and a quantity of downlink subframes used in the frame and which subframes are specifically configured as downlink subframes, where an uplink refers to a transmission link from user equipment to a device, an uplink subframe is a subframe used for such transmission, a downlink refers to a transmission link from a device to user equipment, and a downlink subframe is a subframe used for such transmission.

With reference to the first aspect and the second possible implementation manner, in a sixth possible implementation manner, in a case in which the first device is not in time synchronization with the second device, the first device adjusts the frequency resource used to transmit data, that is, cancels or reduces frequency guard space of the first device; and in the method, the coordination between the first device and the second device, that is, a handshake mechanism used between the first device and the second device, includes:

the second device notifies the first device that the second device has a capability of configuring, according to the frequency resource configured by the first device, a frequency resource used to transmit data by the second device;

the first device notifies the second device that the first device is not in time synchronization with the second device, and the first device has configured a frequency resource close to an edge of a frequency band, where the frequency resource is used to transmit data.

With reference to the first aspect and the second possible implementation manner, a seventh possible implementation manner, that the second device releases frequency guard space of the second device refers to that the second device configures a frequency resource far away from an edge of a frequency band (an edge of a frequency band adjacent to the first device) of the second device, where the frequency resource is used to transmit data, that is, increases frequency guard space of the second device, which is specifically as follows:

Assuming that a frequency at a boundary between frequency bands of the first device and the second device is $F_B$, a frequency $F_2$ is a frequency raster, closest to $F_B$, in a frequency resource that is configured by the second device and that is used to transmit data, and a frequency distance to $F_B$ is $G_2=|F_2-F_B|$, where $F_2$ is characterized in that:

assuming that first user equipment and second user equipment communicate with the first device and the second device respectively, when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$; and a value of $F_2$ makes $G_2$ meet a condition $G_2>G_{a2}$; and a maximum level of spurious emission of a signal of the second device is $L_2$, where a value of $L_2$ is characterized in that:

$L_2<L_{a2}$, where $L_{a2}$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_{a2}$.

With reference to the first aspect and the first and second possible implementation manners, in an eighth possible implementation manner, a value of the guard space $G_1$ after adjustment of the first device includes:

the value of $G_1$ is 0; or the value of $G_1$ is selected from multiple values, where the multiple values are predefined values, where multiple values correspond to multiple types of synchronization precision that the first device can reach with respect to the second device; or the multiple values correspond to multiple combinations of respective synchronization statuses of the first device and the second device.

With reference to the first aspect and the first and second possible implementation manners, in a ninth possible implementation manner, a level of spurious emission of the first device is spurious emission measured inside the measurement bandwidth at the edge of the frequency band of the first device; or a level of spurious emission is spurious emission measured inside a measurement bandwidth at an edge of the frequency band, of the second device, adjacent to the frequency band of the first device; or a level of spurious emission is spurious emission measured inside a measurement bandwidth across the edge of the frequency band of the first device and an edge of the frequency band of the second device.

With reference to the first aspect and the seventh possible implementation manner, in the ninth possible implementation manner, a level of spurious emission of the second device is spurious emission measured inside a measurement bandwidth at an edge of the frequency band of the second device; or a level of spurious emission is spurious emission measured inside a measurement bandwidth at an edge of the frequency band, of the second device, adjacent to the frequency band of the first device; or a level of spurious emission is spurious emission measured inside a measurement bandwidth across the edge of the frequency band of the first device and an edge of the frequency band of the second device.

With reference to the first aspect, in a tenth possible implementation manner, a method for the first device to configure a position of a frequency resource used to transmit data further includes:

adjusting, by the first device, a start position or an end position of sending a signal, to avoid a period during which the second device receives a signal, which is specifically as follows:

In an actual network, it cannot be avoided that a residual error in time synchronization still exists between the first device and the second device, and this is mainly caused by synchronization precision of the devices; and when a residual error in time synchronization exists, the first device adjusts a start moment or an end moment of transmitting a signal by the device, and correspondingly, the first user equipment connected to the first device correspondingly adjusts a start time or an end time of receiving a signal, to avoid a signal transmitted by second user equipment connected to the second device, thereby avoiding interference between networks.

With reference to the first aspect, in an eleventh possible implementation manner, a method for the first device to configure a position of a frequency resource used to transmit data further includes:

adjusting, by the second device, a start position or an end position of receiving a signal, to avoid a period of sending a signal by the first device, which is specifically as follows:

When a residual error in time synchronization exists, the second device may adjust a start position or an end position of receiving a signal of the second device, and correspondingly, second user equipment connected to the second device adjusts a start position or an end position of transmitting a signal by the second user equipment, so as to avoid a signal received by the first user equipment connected to the first device, thereby avoiding interference between networks.

With reference to the first aspect and the first, second, and seventh possible implementation manners, in a twelfth possible implementation manner, a case in which uplink-to-downlink interference exists between any first user equipment and any second user equipment includes:

the first device is not synchronous with the second device; or the first device is synchronous with the second device, and the first device and the second device use different multiplexing technologies, or use different uplink-downlink subframe configurations.

According to a second aspect, a method for transmitting data by using a configured frequency resource is provided, including:

transmitting, by a first device, data by using a saved frequency resource, where the saved frequency resource specifically refers to: assuming that when the first device is not synchronous with a second device, a minimum distance from an edge, of a frequency resource that is allocated by the first device and that is used to transmit data, to a boundary between frequency bands of the first device and the second device is $G_a$; and when the first device is synchronous with the second device, the minimum distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a-G_1$ is saved; and notifying, by the first device, first user equipment that a transmission frequency resource of the first device changes, where the first user equipment needs to feed back a transmission capability of the first user equipment to the first device after the first user equipment receives the notification notifying that a transmission frequency resource of the first device changes.

With reference to the second aspect, in a first possible implementation manner, a manner in which the first device uses the saved frequency resource includes: configuring a carrier frequency, and extending a bandwidth of a carrier frequency to transmit data by using the saved frequency resource; or configuring multiple carrier frequencies, and utilizing carrier aggregation to use the saved frequency resource, where carrier aggregation refers to that multiple carrier frequencies are simultaneously used for uplink and/or downlink data transmission between the first device and the first user equipment; the definition of carrier aggregation described herein is applicable to other parts of the present invention.

With reference to the second aspect and the first possible implementation manner, in a second possible implementation manner, the first device extends a bandwidth in a high-frequency or low-frequency direction without changing a center frequency of a common signal in a carrier frequency or multiple carrier frequencies configured by the first device, and, where the common signal includes but is not limited to: a primary synchronization signal, a secondary synchronization signal, a broadcast signal, and a reference signal.

With reference to the second aspect and the second possible implementation manner, in a third possible implementation method, an implementation manner of the extending a bandwidth in a high-frequency or low-frequency direction is that the bandwidth increased in the high-frequency direction by the first device is not equal to the bandwidth increased in the low-frequency direction.

With reference to the second aspect and the second possible implementation manner, in a fourth possible implementation method, an implementation manner of the extending a bandwidth in a high-frequency or low-frequency direction is that: the first device imposes constraint so that the bandwidth increased in the high-frequency direction is equal to the bandwidth increased in the low-frequency direction.

With reference to the second aspect and the first possible implementation manner, in a fifth possible implementation manner, a manner of the extending a bandwidth is that the first device extends a bandwidth and changes a center frequency of a common signal in a carrier frequency, to make an entire configured bandwidth symmetric with respect to the center frequency of the common signal.

With reference to the second aspect, in a sixth possible implementation manner, a method for the configuring multiple carrier frequencies includes: keeping, by the first device, a center frequency and a bandwidth of a carrier frequency that are before adjustment unchanged, configuring a new carrier frequency on the saved frequency resource, where the new carrier frequency is used to transmit data, where adjustment refers to synchronization adjustment by the first device according to synchronization information of the second device, and configuring the saved frequency resource to be used to transmit data.

With reference to the second aspect and the first and second possible implementation manners, in a seventh possible implementation manner, a center frequency of the common signal is an integer multiple of 300 KHz or 100 KHz.

With reference to the second aspect, in an eighth possible implementation manner, the notifying, by the first device, first user equipment that a transmission frequency resource of the first device changes includes:

notifying, by the first device, the first user equipment of a center frequency of each carrier frequency, a bandwidth of a carrier frequency, and a quantity of carrier frequencies in carrier aggregation; or instructing, by the first device, the first user equipment to use one or more of a predefined center frequency of a carrier frequency or a bandwidth of a carrier frequency.

With reference to the second aspect, in a ninth possible implementation manner, that the first user equipment needs to feed back a transmission capability of the first user equipment to the first device after the first user equipment receives the notification notifying that a transmission frequency resource of the first device changes includes:

notifying, by the first user equipment, the first device that the first user equipment can support transmission on a transmission frequency resource indicated by the first device; or notifying, by the first user equipment, the first device that the first user equipment can partially support transmission on a transmission frequency resource indicated by the first device, where the first user equipment may indicate a position of a transmission frequency resource and a size of the resource that can be supported by the first user equipment; or notifying, by the first user equipment, the first device that the first user equipment cannot support transmission on a transmission frequency resource indicated by the first device.

According to a third aspect, a first device is provided, including:

an acquiring unit, configured to acquire synchronization information of a second device;

a determining and adjustment unit, configured to determine a synchronization status between the first device and the second device according to the synchronization information of the second device; and adjust a synchronization relationship between the first device and the second device, and set a synchronization status of the first device;

a configuration unit, configured to configure a frequency resource close to an edge of a frequency band according to the synchronization information of the second device that is output by a determining and a adjustment unit, where the frequency resource is used to transmit data; that is, cancel or reduce frequency guard space;

a transmission scheduling unit, configured to schedule and use the configured frequency resource to transmit data;

a sending unit, further configured to notify first user equipment that a transmission frequency resource of the first device changes;

a receiving unit, configured to receive feedback information of the first user equipment, where the feedback information is a fed-back receiving capability of the first user equipment, where the sending unit is further configured to: when the first device is not synchronous with the second device, notify the second device that the first device is not in time synchronization with the second device, and the first device has configured a frequency resource close to an edge of a frequency band, where the frequency resource is used to transmit data.

With reference to the third aspect, in a first possible implementation manner, the synchronization information of the second device includes: timing information of the second device, or indication information for at least one of the following synchronization statuses:

whether a device is synchronous with a preset time, or whether clock synchronization of a device is reliable, or whether clock synchronization of a device is directly from a global navigation satellite system, or whether clock synchronization of a device is directly from clock synchronization of a wired network, or whether clock synchronization of a device is from reliable network listening, or whether a level of clock synchronization of a device is less than a set threshold, or whether precision of clock synchronization of a device is greater than a set threshold.

With reference to the third aspect, in a second possible implementation manner, the synchronization information of the second device further includes a center carrier frequency position, acquired by the first device, of a frequency resource that is configured by the second device and that is used for transmission.

With reference to the third aspect, in a third possible implementation manner, a method for the first device to acquire timing information of the second device or information about the center carrier frequency position of the second device includes:

searching for and receiving, by the first device, a synchronization reference signal sent by the second device, and processing the reference signal, to obtain the synchronization information; or receiving, by the first device in a wired manner, a signal sent by the second device to obtain the synchronization information; or obtaining, by the first device, the timing information of the second device or information about a center frequency position of the second device by using a center controller.

With reference to the third aspect, in a fourth possible implementation manner, the determining and adjustment unit is characterized in that:

when the second device is synchronous with a preset time, or clock synchronization of the second device is reliable, or clock synchronization of the second device is directly from a global navigation satellite system, or clock synchronization of the second device is directly from time synchronization of a wired network, or clock synchronization of the second device is from reliable network listening, or a level of clock synchronization of the second device is less than a set threshold, or precision of clock synchronization of the second device is greater than a set threshold, the first device adjusts timing according to a time of the second device, to implement clock synchronization between the first device and the second device.

With reference to the third aspect and the fourth possible implementation manner, in a fifth possible implementation manner, the first device adjusts timing according to a time of the second device, and sets a synchronization status of the first device to be that:

a clock of the first device is synchronous with a preset time, or clock synchronization of the first device is reliable, or a clock of the first device is from reliable network listening, or a level of clock synchronization of the first device is less than a set threshold, or precision of clock synchronization of the first device is greater than a set threshold.

With reference to the third aspect, in a sixth possible implementation manner, the configuration unit configures a frequency resource close to an edge of a frequency band, where the frequency resource is used to transmit data, where in a case in which the first device is synchronous with the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1 = |F_1 - F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a = |F_a - F_B|$; and a value of $F_1$ makes $G_1$ meet a condition $G_1 < G_a$.

With reference to the third aspect and with reference to the sixth possible implementation, in a seventh possible implementation manner, after the first device completes synchronization adjustment and cancels or reduces frequency guard space, when the first device and the second device both use a time division duplex technology, the first device and the second device use a same uplink-downlink subframe configuration.

With reference to the third aspect, in an eighth possible implementation manner, the configuration unit configures a frequency resource close to an edge of a frequency band, where the frequency resource is used to transmit data, or another method may further be used:

in a case in which the first device is not synchronous with the second device, when the second device can configure, according to the frequency resource configured by the first device, a frequency resource used to transmit data by the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1 = |F_1 - F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a = |F_a - F_B|$; and a value of $F_1$ makes $G_1$ meet a condition $G_1 < G_a$.

With reference to the third aspect and with reference to the sixth and eighth possible implementation manners, in a ninth possible implementation manner, a value of $G_1$ is 0; or a value of $G_1$ is selected from multiple values, where the multiple values are predefined values, where the multiple values correspond to multiple types of synchronization precision that the first device can reach with respect to the second device; or the multiple values correspond to multiple combinations of respective synchronization statuses of the first device and the second device.

With reference to the third aspect and with reference to the sixth and eighth possible implementation manners, in a tenth possible implementation manner, the first device configures a frequency resource close to an edge of a frequency band, where the frequency resource is used for transmission, that is, cancels or reduces frequency guard space, so that a level of spurious emission at a boundary between the frequency bands of the first device and the second device is increased;

because the first device is synchronous with the second device, and the first device and the second device use a same time division duplex manner and a same uplink-downlink subframe configuration, interference to reception from transmission between the devices is greatly reduced or no longer exists;

therefore, in the standards, an index of a level of spurious emission in this scenario may be extended;

a specific spurious level is:

a maximum level of spurious emission of a signal of the first device is $L_1$, where a value of $L_1$ is characterized in that:

$L_1 > L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$, where a level of spurious emission of the signal of the first device is characterized in that:

the level of spurious emission is spurious emission measured inside the measurement bandwidth at the edge of the frequency band of the first device; or the level of spurious emission is spurious emission measured inside a measurement bandwidth at an edge of the frequency band, of the second device, adjacent to the frequency band of the first device; or the level of spurious emission is spurious emission measured inside a measurement bandwidth across the edge of the frequency band of the first device and an edge of the frequency band of the second device.

With reference to the third aspect and with reference to the sixth and eighth implementation manners, in an eleventh possible implementation manner, by means of coordination by the first device or coordination between the first device and the second device, frequency guard space of the first device is canceled or reduced, and in this case, because a residual error in synchronization exists, uplink-to-downlink interference may still exist between the devices;

in this case, the first device adjusts a start position of sending a signal, to avoid a period during which the second device receives a signal; or the first device adjusts an end position of sending a signal, to avoid a period during which the second device receives a signal.

In the foregoing description, the case in which uplink-to-downlink interference exists between any first user equipment and any second user equipment includes: the first device is not synchronous with the second device; or the first device is synchronous with the second device, and the first device and the second device use different multiplexing technologies, or use different uplink-downlink subframe configurations.

With reference to the third aspect, in a twelfth possible implementation manner, the transmission scheduling unit is characterized in that:

the transmitting, by the sending unit of the first device, data by using a saved frequency resource, where the saved frequency resource is characterized in that:

assuming that when the first device is not synchronous with the second device, a minimum distance from an edge, of a frequency resource that is allocated by the first device and that is used to transmit data, to a boundary between frequency bands of the first device and the second device is $G_a$; and when the first device is synchronous with the second device, the distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a-G_1$ is saved, where a manner in which the first device uses the saved frequency resource includes: configuring a carrier frequency, and extending a bandwidth of a carrier frequency to transmit data by using the saved frequency resource; or configuring multiple carrier frequencies, and utilizing carrier aggregation to use the saved frequency resource.

With reference to the third aspect and with reference to the twelfth possible implementation manner, in a thirteenth possible implementation manner, a manner in which the scheduling unit extends a bandwidth includes:

the configuring a carrier frequency or multiple carrier frequencies is characterized in that: the first device extends a bandwidth in a high-frequency or low-frequency direction without changing a center frequency of a common signal in a carrier frequency, where the extending a bandwidth in a high-frequency or low-frequency direction is characterized in that: the bandwidth increased in the high-frequency direction by the first device is not equal to the bandwidth increased in the low-frequency direction; or the extending a bandwidth in a high-frequency or low-frequency direction is characterized in that: the first device imposes constraint so that the bandwidth increased in the high-frequency direction is equal to the bandwidth increased in the low-frequency direction.

With reference to the third aspect, in a fourteenth possible implementation manner, the configuring a carrier frequency or multiple carrier frequencies is further characterized in that: the first device extends a bandwidth and changes a center frequency of a common signal in a carrier frequency, to make an entire configured bandwidth symmetric with respect to the center frequency of the common signal.

With reference to the third aspect and with reference to the twelfth possible implementation manner, in a fifteenth possible implementation manner, the configuring multiple carrier frequencies is further characterized in that: the first device keeps a center frequency and a bandwidth of a carrier frequency that are before adjustment unchanged, configures a new carrier frequency on the saved frequency resource, where the new carrier frequency is used to transmit data, where the adjustment refers to synchronization adjustment by the first device according to synchronization information of the second device, and configuring the saved frequency resource to be used to transmit data.

The foregoing common signal includes: a primary synchronization signal, a secondary synchronization signal, a broadcast signal, and a reference signal.

With reference to the third aspect and with reference to the thirteenth and fourteenth possible implementation manners, in the sixteenth possible implementation manner, a center frequency of a common signal in a configured single carrier frequency or multiple carrier frequencies is an integer multiple of 300 KHz or 100 KHz.

In a seventeenth possible implementation manner, with reference to the third aspect, the notifying, by the sending unit, the first user equipment that a transmission frequency resource of the first device changes includes:

notifying the first user equipment of a center frequency of each carrier frequency, a bandwidth of a carrier frequency, a quantity of carrier frequencies in carrier aggregation; or instructing, by the first device, the first user equipment to use one or more of a predefined center frequency of a carrier frequency or a bandwidth of a carrier frequency.

According to a fourth aspect, a second device is provided, including:

a sending unit, configured to notify a first device that the second device has a capability of configuring, according to a frequency resource configured by the first device, a frequency resource used to transmit data by the second device;

a receiving unit, configured to receive notification information from the first device, where when the first device is not synchronous with the second device, the first device notifies the second device that the first device is not in time synchronization with the second device, and the first device has configured a frequency resource close to an edge of a frequency band, where the frequency resource is used to transmit data; and a configuration unit, configured to: after the notification of the first device is received, configure, by the second device, a frequency resource used to transmit data.

With reference to the fourth aspect, in a first possible implementation manner, after the notification of the first device is received, that is, the first device indicates that the first device is not synchronous with the second device, but the first device configures a frequency resource close to an edge of a frequency band, where the frequency resource is used to transmit data, and a frequency resource that is configured by the second device and that is used to transmit data is characterized in that:

assuming that a frequency at a boundary between frequency bands of the first device and the second device is $F_B$, a frequency $F_2$ is a frequency raster, closest to $F_B$, in the frequency resource that is configured by the second device and that is used to transmit data, and a frequency distance to $F_B$ is $G_2=|F_2-F_B|$, where $F_2$ is characterized in that:

assuming that first user equipment and second user equipment communicate with the first device and the second device respectively, when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$;

a value of $F_2$ makes $G_2$ meet a condition $G_2 > G_{a2}$;

in the manner, because a synchronization signal source used by the first device has better quality than a synchronization source of the second device and is not willing to synchronize with the second device; simultaneously, the second device is also willing to expand frequency guard space in the frequency band of the second device, so as to avoid interference between the first device and the second device;

a final effect is that sizes of frequency guard space of the first device and the second device are not changed and are equal to sizes of guard space in a case in which interference exists between the devices; however, guard space of the first device is reduced, and guard space of the second device is correspondingly increased.

With reference to the fourth aspect and with reference to the first possible implementation manner, in a second possible implementation manner, a position of a frequency resource used to transmit data by the second device is characterized in that:

a maximum level of spurious emission of a signal of the second device is $L_2$, where a value of $L_2$ is characterized in that:

$L_2 < L_{a2}$, where $L_{a2}$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_{a2}$, where a level of spurious emission of the signal of the second device is spurious emission measured inside a measurement bandwidth at an edge of the frequency band of the second device; or a level of spurious emission is spurious emission measured inside a measurement bandwidth at an edge of a frequency band, of the second device, adjacent to the frequency band of the first device; or a level of spurious emission is spurious emission measured inside a measurement bandwidth across the edge of the frequency band of the first device and an edge of the frequency band of the second device; or when a resolution bandwidth is less than a measurement bandwidth, a level of spurious emission is a result of accumulation, inside the measurement bandwidth, of measured values inside the resolution bandwidth.

In the foregoing possible implementation manners, the case in which uplink-to-downlink interference exists between any first user equipment and any second user equipment includes: the first device is not synchronous with the second device; or the first device is synchronous with the second device, and the first device and the second device use different multiplexing technologies, or use different uplink-downlink subframe configurations.

With reference to the fourth aspect, in a third possible implementation manner, by means of coordination of the first device and the second device, the frequency guard space of the first device is canceled or reduced, and in this case, because a residual error in synchronization exists, uplink-to-downlink interference may still exist between the devices; in this case, the second device adjusts a start position of receiving a signal, to avoid a period during which the first device sends a signal; or the second device adjusts an end position of receiving a signal, to avoid a period during which the first device sends a signal, thereby reducing interference between the devices.

According to a fifth aspect, first user equipment is provided, including:

a receiving unit, configured to receive a notification from a first device, where the notification notifies the first user equipment that a transmission frequency resource of the first device changes; and a sending unit, configured to: after the notification notifying that a transmission frequency resource of the first device changes is received, need to feed back a transmission capability of the first user equipment to the first device.

With reference to the fifth aspect, in a first possible implementation manner, the receiving unit is characterized in that:

the receiving unit receives a notification from the first device, and obtains information about a center frequency of each carrier frequency, a bandwidth of a carrier frequency, and a quantity of carrier frequencies in carrier aggregation; or receives a notification from the first device, and obtains information about that one or more of a predefined center frequency of a carrier frequency or a bandwidth of a carrier frequency are used for each carrier frequency.

With reference to the fifth aspect, in a second possible implementation manner, the sending unit is characterized in:

notifying the first device that the first user equipment can support transmission on a transmission frequency resource indicated by the first device; or notifying the first device that the first user equipment can partially support transmission on a transmission frequency resource indicated by the first device, where the first user equipment may indicate a position of a transmission frequency resource and a size of the resource that can be supported by the first user equipment; or notifying the first device that the first user equipment cannot support transmission on a transmission frequency resource indicated by the first device.

According to a sixth aspect, a first device is provided, including:

including: at least one processor, a memory, a communications interface, and a bus, where the at least one processor, the memory, and the communications interface are connected to and communicate with each other by using the bus, and the memory is configured to store program code, where the processor is configured to invoke the program code in the memory, so as to perform the following operations:

acquiring synchronization information of a second device by using at least one communications interface;

configuring a frequency resource close to an edge of a frequency band according to the synchronization information of the second device, where the frequency resource is used to transmit data;

scheduling and using the communications interface, and scheduling and using the configured frequency resource to transmit data;

notifying, by using the at least one communications interface, first user equipment that a transmission frequency resource of the first device changes;

receiving feedback information of the first user equipment by using the at least one communications interface, where the feedback information is a fed-back receiving capability of the first user equipment; and when the first device is not synchronous with the second device, notifying, by using the at least one communications interface, the second device that the first device is not in time synchronization with the second device and that the first device has configured a frequency resource close to an edge of a frequency band, where the frequency resource is used to transmit data.

With reference to the sixth aspect, in a first possible implementation manner, the synchronization information of the second device includes: timing information of the second device, or indication information for at least one of the following synchronization statuses:

whether a device is synchronous with a preset time, or
whether clock synchronization of a device is reliable, or
whether clock synchronization of a device is directly from a global navigation satellite system, or
whether clock synchronization of a device is directly from clock synchronization of a wired network, or
whether clock synchronization of a device is from reliable network listening, or
whether a level of clock synchronization of a device is less than a set threshold, or
whether precision of clock synchronization of a device is greater than a set threshold.

With reference to the sixth aspect, in a second possible implementation manner, the synchronization information of the second device further includes, a center carrier frequency position, acquired by the first device, of a frequency resource that is configured by the second device and that is used for transmission.

With reference to the sixth aspect and with reference to the first possible implementation manner and the second possible implementation manner, in a third possible implementation manner, a method in which the processor is configured to acquire the timing information of the second device or information about the center carrier frequency position of the second device by using at least one communications interface includes:

searching for and receiving, by the first device, a synchronization reference signal sent by the second device, and processing the reference signal, to obtain the synchronization information; or receiving, by the first device in a wired manner, a signal sent by the second device to obtain the synchronization information; or obtaining, by the first device, the timing information of the second device or information about a center frequency position of the second device by using a center controller.

With reference to the sixth aspect, in a fourth possible implementation manner, the processor is configured to: when the second device is synchronous with a preset time, or clock synchronization of the second device is reliable, or clock synchronization of the second device is directly from a global navigation satellite system, or clock synchronization of the second device is directly from time synchronization of a wired network, or clock synchronization of the second device is from reliable network listening, or a level of clock synchronization of the second device is less than a set threshold, or precision of clock synchronization of the second device is greater than a set threshold, adjust timing according to a time of the second device, to implement clock synchronization between the first device and the second device;

With reference to the sixth aspect and with reference to the fourth possible implementation manner, in a fifth possible implementation manner, the processor is configured to: adjust timing according to a time of the second device, and set a synchronization status of the first device to be that: a clock of the first device is synchronous with a preset time, or clock synchronization of the first device is reliable, or a clock of the first device is from reliable network listening, or a level of clock synchronization of the first device is less than a set threshold, or precision of clock synchronization of the first device is greater than a set threshold.

With reference to the sixth aspect, in a sixth possible implementation manner, the processor configures a frequency resource close to an edge of a frequency band, where the frequency resource is used to transmit data, where in a case in which the first device is synchronous with the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1=|F_1-F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and a value of $F_1$ makes $G_1$ meet a condition $G_1<G_a$.

With reference to the sixth aspect and with reference to the sixth possible implementation manner, in a seventh possible implementation manner, the processor is configured to: when the first device and the second device both use a time division duplex technology, set that the first device uses a same uplink-downlink subframe configuration as the second device.

With reference to the sixth aspect, in an eighth possible implementation manner, the processor is configured to configure a frequency resource close to an edge of a frequency band, where the frequency resource is used to transmit data, where in a case in which the first device is not synchronous with the second device, when the second device can configure, according to the frequency resource configured by the first device, a frequency resource used to transmit data by the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1=|F_1-F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and a value of $F_1$ makes $G_1$ meet a condition $G_1<G_a$.

With reference to the sixth aspect and with reference to the sixth and eighth possible implementation manners, in a ninth possible implementation manner, $G_1$ set by the processor is 0; or a value of $G_1$ is selected from multiple values, where the multiple values are predefined values, where the multiple values of $G_1$ that are used by the processor correspond to multiple types of synchronization precision that the first device can reach with respect to the second device; or the multiple values correspond to multiple combinations of respective synchronization statuses of the first device and the second device.

With reference to the sixth aspect and with reference to the sixth and eighth possible implementation manners, in a tenth possible implementation manner, the processor of the first device configures a frequency resource close to an edge of a frequency band, where the frequency resource is used for transmission, that is, cancels or reduces frequency guard space, so that a level of spurious emission at a boundary between the frequency bands of the first device and the second device is increased;

because the first device is synchronous with the second device, and the first device and the second device use a same time division duplex manner and an uplink-downlink subframe configuration, and therefore, interference to reception from transmission between the devices is greatly reduced or no longer exists;

therefore, in the standards, an index of a level of spurious emission in this scenario may be extended;

a specific spurious level is:

a maximum level of spurious emission of a signal of the first device is $L_1$, where a value of $L_1$ is characterized in that:

$L_1 > L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$, where a level of spurious emission of the signal of the first device is characterized in that:

the level of spurious emission is spurious emission measured inside the measurement bandwidth at the edge of the frequency band of the first device; or the level of spurious emission is spurious emission measured inside a measurement bandwidth at an edge of the frequency band, of the second device, adjacent to the frequency band of the first device; or the level of spurious emission is spurious emission measured inside a measurement bandwidth across the edge of the frequency band of the first device and an edge of the frequency band of the second device.

With reference to the sixth aspect and with reference to the sixth and eighth implementation manners, in an eleventh possible implementation manner, by means of configuration of the processor of the first device, or coordination of the processor of the first device and the second device by using the communications interface, the frequency guard space of the first device is canceled or reduced, and in this case, because a residual error in synchronization exists, uplink-to-downlink interference may still exist between the devices;

in this case, the first device adjusts a start position of sending a signal, to avoid a period during which the second device receives a signal; or the first device adjusts an end position of sending a signal, to avoid a period during which the second device receives a signal.

In the foregoing description, the case in which uplink-to-downlink interference exists between any first user equipment and any second user equipment includes: the first device is not synchronous with the second device; or the first device is synchronous with the second device, and the first device and the second device use different multiplexing technologies, or use different uplink-downlink subframe configurations.

With reference to the sixth aspect, in a twelfth possible implementation manner, the processor of the first device configures and uses a saved frequency resource to transmit data, where the saved frequency resource is characterized in that:

assuming that when the first device is not synchronous with the second device, a minimum distance from an edge, of a frequency resource that is allocated by the first device and that is used to transmit data, to a boundary between frequency bands of the first device and the second device is $G_a$; and when the first device is synchronous with the second device, the minimum distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a - G_1$ is saved, where a manner in which the first device uses the saved frequency resource includes: configuring a carrier frequency, and extending a bandwidth of a carrier frequency to transmit data by using the saved frequency resource; or configuring multiple carrier frequencies, and utilizing carrier aggregation to use the saved frequency resource.

With reference to the sixth aspect and with reference to the twelfth possible implementation manner, in a thirteenth possible implementation manner, the processor configures a carrier frequency or multiple carrier frequencies to use a saved frequency resource after guard space is reduced, where configuration by the processor extends a bandwidth in a high-frequency or low-frequency direction without changing a center frequency of a common signal in a carrier frequency, where the extending a bandwidth in a high-frequency or low-frequency direction is characterized in that: the bandwidth increased in the high-frequency direction by the first device is not equal to the bandwidth increased in the low-frequency direction; or the extending a bandwidth in a high-frequency or low-frequency direction is characterized in that: the first device imposes constraint so that the bandwidth increased in the high-frequency direction is equal to the bandwidth increased in the low-frequency direction.

With reference to the sixth aspect, in a fourteenth possible implementation manner, that the processor configures a carrier frequency or multiple carrier frequencies is further characterized in that: the processor of the first device extends a bandwidth, and changes a center frequency of a common signal in a carrier frequency, to make an entire configured bandwidth symmetric with respect to the center frequency of the common signal.

With reference to the sixth aspect and with reference to the twelfth possible implementation manner, in a fifteenth possible implementation manner, the configuring multiple carrier frequencies is further characterized in that: the first device keeps a center frequency and a bandwidth of a carrier frequency that are before adjustment unchanged, configures a new carrier frequency on the saved frequency resource, where the new carrier frequency is used to transmit data, where the adjustment refers to synchronization adjustment by the first device according to synchronization information of the second device, and configuring the saved frequency resource to be used to transmit data.

The foregoing common signal includes: a primary synchronization signal, a secondary synchronization signal, a broadcast signal, and a reference signal.

With reference to the sixth aspect and with reference to the thirteenth and fourteenth possible implementation manners, in a sixteenth possible implementation manner, a center frequency of a common signal in a configured single carrier frequency or multiple carrier frequencies is an integer multiple of 300 KHz or 100 KHz.

With reference to the sixth aspect, in a seventeenth possible implementation manner, the notifying, by the processor of the first device by using at least one communications interface, the first user equipment that a transmission frequency resource of the first device changes includes:

notifying the first user equipment of a center frequency of each carrier frequency, a bandwidth of a carrier frequency, and a quantity of carrier frequencies in carrier aggregation; or instructing, by the first device, the first user equipment to use one or more of a predefined center frequency of a carrier frequency or a bandwidth of a carrier frequency.

According to a seventh aspect, a second device is provided, including:

at least one processor, a memory, a communications interface, and a bus, where the at least one processor, the memory, and the communications interface are connected to and communicate with each other by using the bus, and the memory is configured to store program code, where the processor is configured to invoke the program code in the memory, so as to perform the following operations:

notifying a first device by using at least one communications interface that the second device has a capability of configuring, according to the frequency resource configured by the first device, a frequency resource used to transmit data by the second device;

receiving a notification of the first device by using the at least one communications interface: when the first device is not synchronous with the second device, the first device notifies the second device that the first device is not in time synchronization with the second device, and the first device has configured a frequency resource close to an edge of a frequency band, where the frequency resource is used to transmit data;

after the notification of the first device is received, the processor configures a frequency resource used to transmit data.

With reference to the seventh aspect, in a first possible implementation manner, the processor is configured to: after the notification of the first device is received, that is, the first device indicates that the first device is not synchronous with the second device, but the first device configures a frequency resource close to an edge of a frequency band used to transmit data, the second device configures a frequency resource that is used to transmit data, where assuming that a frequency at a boundary between frequency bands of the first device and the second device is $F_B$, a frequency $F_2$ is a frequency raster, closest to $F_B$, in a frequency resource that is configured by the second device and that is used to transmit data, and a frequency distance to $F_B$ is $G_2=|F_2-F_B|$, where $F_2$ is characterized in that:

assuming that first user equipment and second user equipment communicate with the first device and the second device respectively, when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$;

a value of $F_2$ makes $G_2$ meet a condition $G_2>G_{a2}$;

in the manner, because a synchronization signal source used by the first device has better quality than a synchronization source of the second device and is not willing to synchronize with the second device; simultaneously, the second device is also willing to expand frequency guard space in a frequency band of the second device, so as to avoid interference between the first device and the second device;

a final effect is that sizes of frequency guard space of the first device and the second device are not changed and are equal to sizes of guard space in a case in which interference exists between the devices; however, guard space of the first device is reduced, and guard space of the second device is correspondingly increased.

With reference to the seventh aspect and with reference to the first possible implementation manner, in a second possible implementation manner, that the processor configures a frequency resource used to transmit data is characterized in that:

a maximum level of spurious emission of a signal of the second device is $L_2$, where a value of $L_2$ is characterized in that:

$L_2<L_{a2}$, where $L_{a2}$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_{a2}$, where a level of spurious emission of the signal of the second device is spurious emission measured inside a measurement bandwidth at an edge of the frequency band of the second device; or a level of spurious emission is spurious emission measured inside a measurement bandwidth at an edge of a frequency band, of the second device, adjacent to the frequency band of the first device; or a level of spurious emission is spurious emission measured inside a measurement bandwidth across the edge of the frequency band of the first device and an edge of a frequency band of the second device; or when a resolution bandwidth is less than a measurement bandwidth, a level of spurious emission is a result of accumulation, inside the measurement bandwidth, of measured values inside the resolution bandwidth.

In the foregoing possible implementation manners, the case in which uplink-to-downlink interference exists between any first user equipment and any second user equipment includes: the first device is not synchronous with the second device; or the first device is synchronous with the second device, and the first device and the second device use different multiplexing technologies, or use different uplink-downlink subframe configurations.

With reference to the seventh aspect, in a third possible implementation manner, by means of coordination of the processor of the first device and the second device by using at least one communications interface, frequency guard space of the first device is canceled or reduced, and in this case, because a residual error in synchronization exists, uplink-to-downlink interference may still exist between the devices; in this case, the second device adjusts a start position of receiving a signal, to avoid a period during which the first device sends a signal; or the second device adjusts an end position of receiving a signal, to avoid a period during which the first device sends a signal, thereby reducing interference between the devices.

According to an eighth aspect, first user equipment is provided, including:

at least one processor, a memory, a communications interface, and a bus, where the at least one processor, the memory, and the communications interface are connected to and communicate with each other by using the bus, and the memory is configured to store program code, where the processor is configured to invoke the program code in the memory, so as to perform the following operations:

receiving a notification from a first device by using at least one communications interface, where the notification notifies the first user equipment that a transmission frequency resource of the first device changes;

after the receiving a notification by using the at least one communications interface that a transmission frequency resource of the first device changes, need feeding back a transmission capability of the first user equipment to the first device.

With reference to the eighth aspect, in a first possible implementation manner, the receiving a notification from the first device by using at least one communications interface includes:

receiving, from the first device, information about a center frequency of each carrier frequency, a bandwidth of a carrier frequency, and a quantity of carrier frequencies in carrier aggregation; or receiving, from the first device, information about that one or more of a predefined center frequency of a carrier frequency or a bandwidth of a carrier frequency are used for each carrier frequency.

With reference to the eighth aspect, in a second possible implementation manner, the feeding back a transmission capability of the first user equipment to the first device by using at least one communications interface is characterized in:

notifying the first device that the first user equipment can support transmission on a transmission frequency resource indicated by the first device; or notifying the first device that the first user equipment can partially support transmission on a transmission frequency resource indicated by the first device, where the first user equipment may indicate a position of a transmission frequency resource and a size of the resource that can be supported by the first user equipment; or notifying the first device that the first user equipment cannot support transmission on a transmission frequency resource indicated by the first device.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
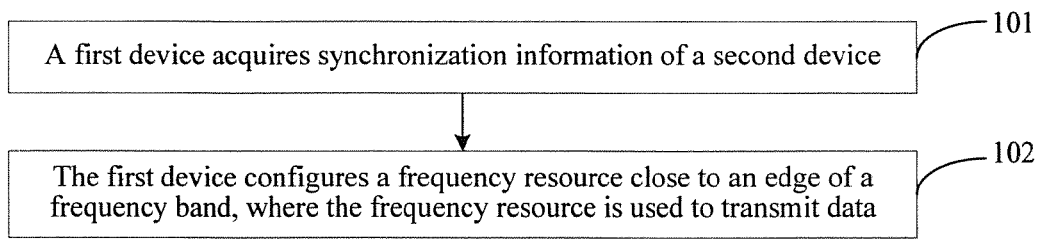
FIG. 1 is a schematic flowchart of a method for configuring a position of a transmission frequency resource according to an embodiment of the present invention.

An embodiment of the present invention provides a method for configuring a position of a transmission frequency resource. Referring to FIG. 1, the method includes the following steps:

101: A first device acquires synchronization information of a second device.

The synchronization information includes timing information of the second device.

Optionally, the synchronization information may further include indication information for at least one of the following synchronization statuses:

whether a device is synchronous with a preset time; or whether clock synchronization of a device is reliable; or whether clock synchronization of a device is directly from a global navigation satellite system; or whether clock synchronization of a device is directly from clock synchronization of a wired network; or whether clock synchronization of a device is from reliable network listening; or whether a level of clock synchronization of a device is less than a set threshold; or whether precision of clock synchronization of a device is greater than a set threshold.

Optionally, the synchronization information may further include a center carrier frequency position of a frequency resource, used for transmission, of the second device.

102: After the first device acquires the synchronization information of the second device, the first device configures a frequency resource used to transmit data.

The meaning of configuring a frequency resource is:

in a case in which the first device is synchronous with the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1 = |F_1 - F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a = |F_a - F_B|$; and a value of $F_1$ makes $G_1$ meet a condition $G_1 < G_a$; or a maximum level of spurious emission of a signal of the first device is $L_1$, where a value of $L_1$ is characterized in that:

$L_1 > L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$.

A beneficial effect of this embodiment is: Compared with a case in which the method is not used, by means of synchronization of the first device and the second device, a guard frequency band is reduced, so that more frequency resources are obtained, thereby improving a system capacity.

Figure 2:
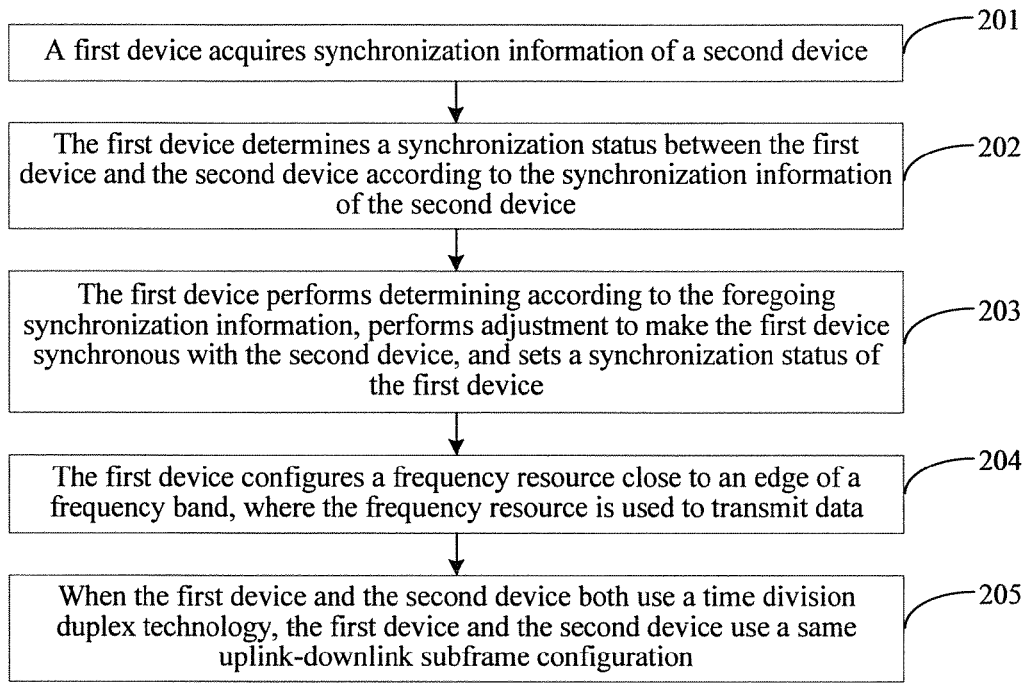
FIG. 2 is a schematic flowchart of another method for configuring a position of a transmission frequency resource according to an embodiment of the present invention.

An embodiment of the present invention provides a method for configuring a position of a transmission frequency resource. Referring to FIG. 2, the method includes the following steps:

201: A first device acquires synchronization information of a second device.

The synchronization information includes: timing information of the second device, or indication information for at least one of the following synchronization statuses:

whether a device is synchronous with a preset time, or whether clock synchronization of a device is reliable, or whether clock synchronization of a device is directly from a global navigation satellite system, or whether clock synchronization of a device is directly from clock synchronization of a wired network, or whether clock synchronization of a device is from reliable network listening, or whether a level of clock synchronization of a device is less than a set threshold, or whether precision of clock synchronization of a device is greater than a set threshold.

The synchronization information further includes a center carrier frequency position, acquired by the first device, of a frequency resource that is configured by the second device and that is used for transmission.

202: The first device determines a synchronization status between the first device and the second device according to the synchronization information of the second device.

The synchronization status refers to a time synchronization relationship between the first device and the second device, that is, whether the first device is synchronous with the second device in time, and the time synchronization relationship includes, but is not limited to, symbol synchronization, subframe synchronization, timeslot synchronization, and frame synchronization. The synchronization status further includes comparison of synchronization statuses of the first device and the second device, including comparison of synchronization precision of two devices, that is, which device has more reliable synchronization precision. The synchronization status further includes comparison of multiplexing manners of two devices, that is, whether both the first device and the second device use a time division duplex manner. The synchronization status further refers to a frequency synchronization relationship between the first device and the second device.

203: The first device performs determining according to the foregoing synchronization information, performs adjustment to make the first device synchronous with the second device, and sets a synchronization status of the first device.

The synchronization status is:

a clock of the first device is synchronous with a preset time, or clock synchronization of the first device is reliable, or a clock of the first device is from reliable network listening, or a level of clock synchronization of the first device is less than a set threshold, or precision of clock synchronization of the first device is greater than a set threshold.

204: The first device configures a frequency resource close to an edge of a frequency band, where the frequency resource is used to transmit data.

The meaning of configuring a frequency resource close to an edge of a frequency band is:

in a case in which the first device is synchronous with the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1 = |F_1 - F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a = |F_a - F_B|$; and a value of $F_1$ makes $G_1$ meet a condition $G_1 < G_a$; or a maximum level of spurious emission of a signal of the first device is $L_1$, where a value of $L_1$ is characterized in that:

$L_1 > L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$.

A beneficial effect of this embodiment is: Compared with a case in which the method is not used, by means of synchronization of the first device and the second device, a guard frequency band is reduced, so that more frequency resources are obtained, thereby improving a system capacity.

205: When the first device and the second device both use a time division duplex technology, the first device and the second device use a same uplink-downlink subframe configuration.

The uplink-downlink subframe configuration is a quantity of uplink subframes used within one frame and specifically which subframe is configured as an uplink subframe and a quantity of downlink subframe used within the frame and specifically which subframe is configured as a downlink subframe, where an uplink refers to a transmission link from user equipment to a device, an uplink subframe is a subframe used for such transmission, a downlink refers to a transmission link from a device to user equipment, and a downlink subframe is a subframe used for such transmission.

After operations of step 201 to step 205 are completed, because a residual error in synchronization may exist, that is, time synchronization between the first device and the second device is not completely precise. In this case, the first device and/or the second device adjusts a start moment or an end moment of sending and/or receiving a signal, to further avoid interference between the devices.

A specific operation is: The first device adjusts a start position of sending a signal, to avoid a period during which the second device receives a signal; or the first device adjusts an end position of sending a signal, to avoid a period during which the second device receives a signal.

Alternatively, the second device adjusts a start position of receiving a signal, to avoid a period during which the first device sends a signal. Alternatively, the second device adjusts an end position of receiving a signal, to avoid a period during which the first device sends a signal;

Compared with Embodiment 1, a beneficial effect of this embodiment is: in a case in which the first device and the second device fail to be completely synchronous, interference between the devices may be further effectively reduced by configuring a time of transmitting a signal and a time of receiving a signal.

Figure 3:
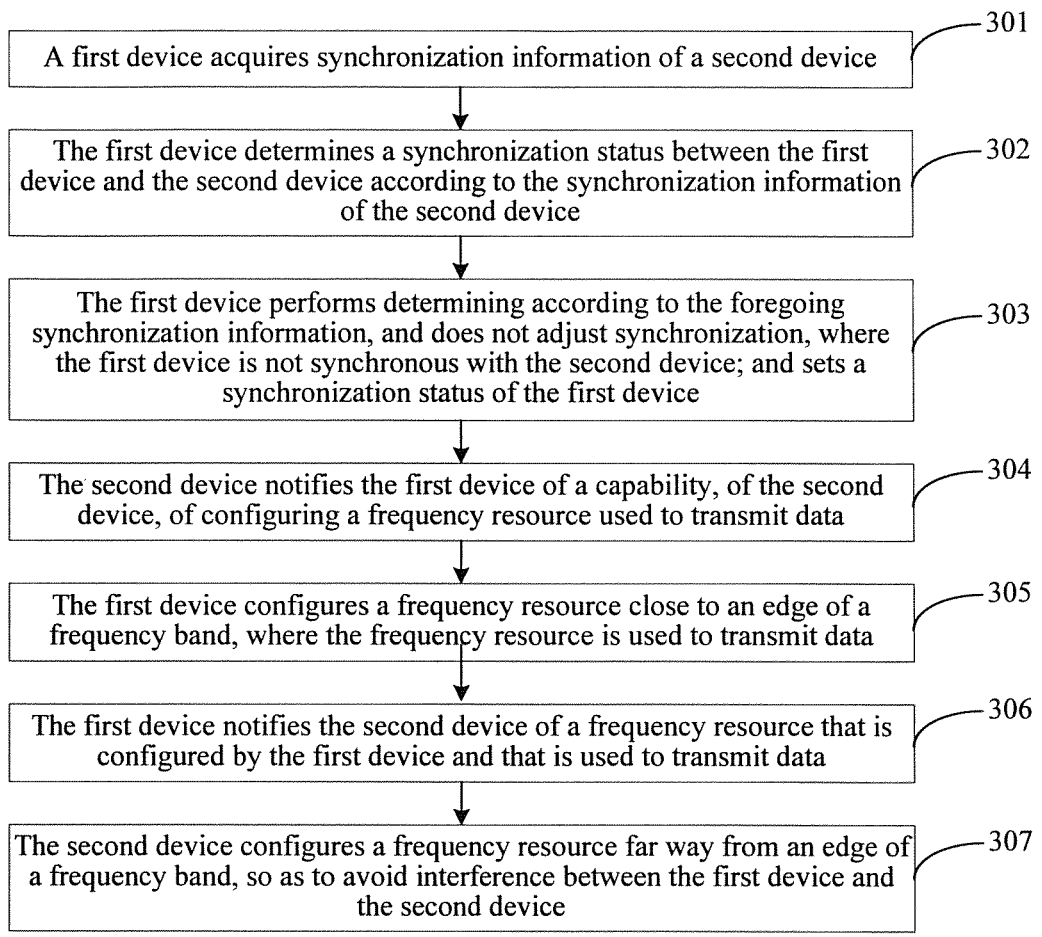
FIG. 3 is a schematic flowchart of still another method for configuring a position of a transmission frequency resource according to an embodiment of the present invention.

An embodiment of the present invention provides a method for configuring a position of a transmission frequency resource. Referring to FIG. 3, the method includes the following steps:

301: A first device acquires synchronization information of a second device.

The synchronization information includes: timing information of the second device, or indication information for at least one of the following synchronization statuses:

whether a device is synchronous with a preset time, or
whether clock synchronization of a device is reliable, or
whether clock synchronization of a device is directly from a global navigation satellite system, or
whether clock synchronization of a device is directly from clock synchronization of a wired network, or
whether clock synchronization of a device is from reliable network listening, or
whether a level of clock synchronization of a device is less than a set threshold, or
whether precision of clock synchronization of a device is greater than a set threshold.

The synchronization information further includes a center carrier frequency position, acquired by the first device, of a frequency resource that is configured by the second device and that is used for transmission.

302: The first device determines a synchronization status between the first device and the second device according to the synchronization information of the second device.

The synchronization status refers to a time synchronization relationship between the first device and the second device, that is, whether the first device is synchronous with the second device in time, and the time synchronization relationship includes, but is not limited to, symbol synchronization, subframe synchronization, timeslot synchronization, and frame synchronization. The synchronization status further includes comparison of synchronization statuses of the first device and the second device, including comparison of synchronization precision of two devices, that is, which device has more reliable synchronization precision. The synchronization status further includes comparison of multiplexing manners of two devices, that is, whether both the first device and the second device use a time division duplex manner. The synchronization status further refers to a frequency synchronization relationship between the first device and the second device.

303: The first device determines, according to the foregoing synchronization information, that the first device does not change time synchronization of the first device, that is, the first device is not synchronous with the second device; and sets a synchronization status of the first device.

The synchronization status refers to:

a clock of the first device is synchronous with a preset time, or
clock synchronization of the first device is reliable, or
a clock of the first device is from reliable network listening, or
a level of clock synchronization of the first device is less than a set threshold, or
precision of clock synchronization of the first device is greater than a set threshold.

304: The first device receives a capability, of the second device and notified by the second device, of configuring a frequency resource used to transmit data.

The capability, of the second device, of configuring a frequency resource refers to: the second device has a capability of configuring, according to the frequency resource configured by the first device, a frequency resource used to transmit data by the second device.

The capability, of the second device and notified by the second device, of configuring a frequency resource used to transmit data may be completed under triggering of the first device; or automatically completed by the second device.

305: After the first device receives the capability notification of the second device described in 304, the first device configures a frequency resource used to transmit data.

The configuration frequency resource is characterized in that:

in a case in which the first device is not synchronous with the second device, when the second device can configure, according to the frequency resource configured by the first device, a frequency resource used to transmit data by the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1=|F_1-F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$;

a value of $F_1$ makes $G_1$ meet a condition $G_1<G_a$; or a maximum level of spurious emission of a signal of the first device is $L_1$, where a value of $L_1$ is characterized in that:

$L_1>L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$.

A beneficial effect of this embodiment is: Compared with a case in which the method is not used, by means of synchronization of the first device and the second device, a guard frequency band is reduced, so that more frequency resources are obtained, thereby improving a system capacity.

306: The first device notifies the second device of a frequency resource that is configured by the first device and that is used to transmit data.

Specific steps are: After the first device completes adjustment of a frequency resource used to transmit data, the first device notifies the second device that the first device is not in time synchronization with the second device, and the first device has configured a frequency resource close to an edge of a frequency band, where the frequency resource is used to transmit data, where the first device notifies the second device of a size and/or a position of the frequency resource configured by the first device.

307: The second device configures to change the configuration of the frequency resource of the second device according to the frequency resource configured by the first device, so as to avoid interference between the first device and the second device.

That the second device changes the configuration of the frequency resource is characterized in that:

assuming that a frequency at a boundary between frequency bands of the first device and the second device is $F_B$, a frequency $F_2$ is a frequency raster, closest to $F_B$, in a frequency resource that is configured by the second device and that is used to transmit data, and a frequency distance to $F_B$ is $G_2=|F_2-F_B|$, where $F_2$ is characterized in that:

assuming that first user equipment and second user equipment communicate with the first device and the second device respectively, when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$; and a value of $F_2$ makes $G_2$ meet a condition $G_2>G_{a2}$.

Compared with Embodiment 1 and Embodiment 2, a beneficial effect of this embodiment is: in a case in which the first device has relatively high synchronization precision, and the first device and the second device have a capability of coordinating a frequency resource configuration, the first device can still reduce a reserved guard space without changing time synchronization of the first device, and the reduction in the guard space is used to transmit data.

Figure 4:
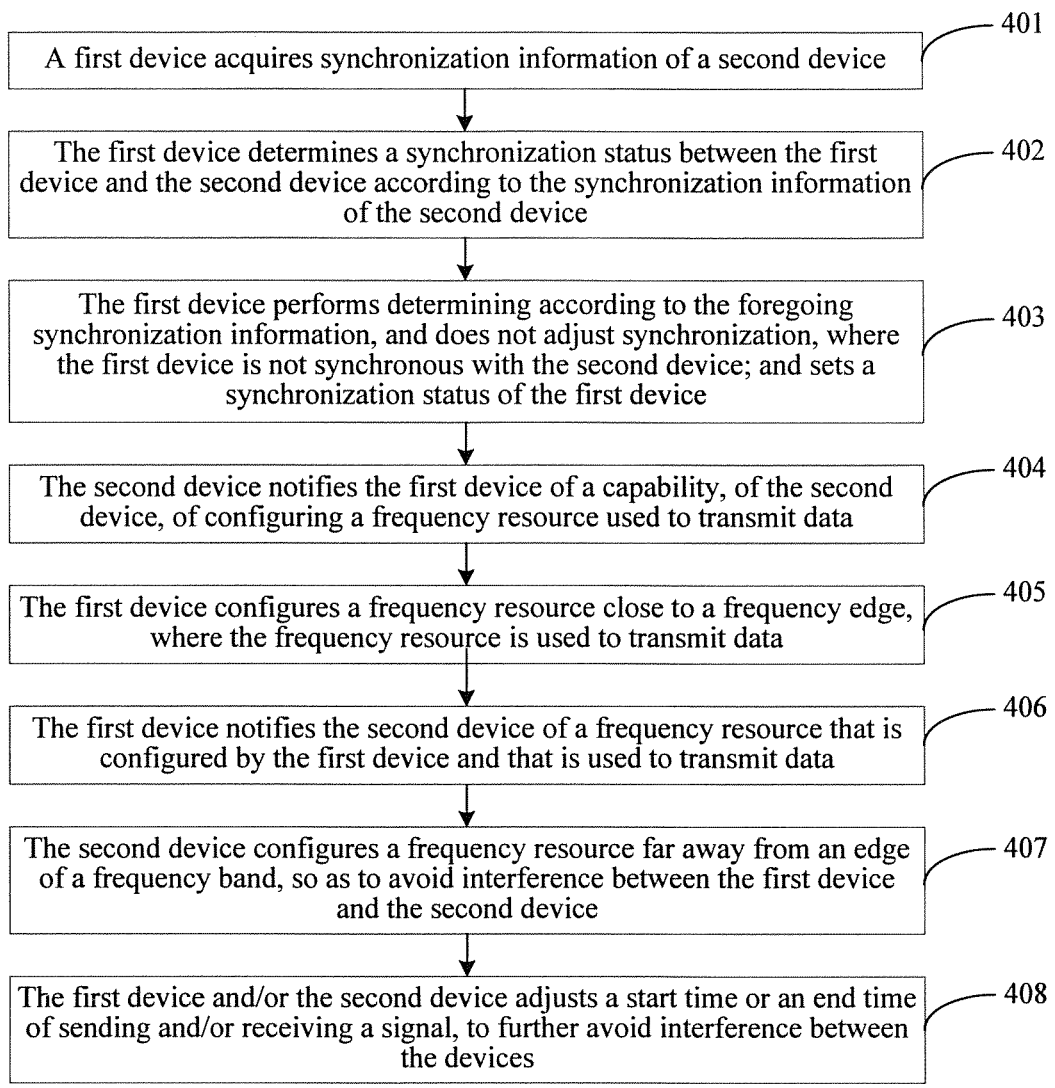
FIG. 4 is a schematic flowchart of yet another method for configuring a position of a transmission frequency resource according to an embodiment of the present invention.

An embodiment of the present invention provides a method for configuring a position of a transmission frequency resource. Referring to FIG. 4, the method includes the following steps:

401: A first device acquires synchronization information of a second device.

The synchronization information includes: timing information of the second device, or indication information for at least one of the following synchronization statuses:

whether a device is synchronous with a preset time, or whether clock synchronization of a device is reliable, or whether clock synchronization of a device is directly from a global navigation satellite system, or whether clock synchronization of a device is directly from clock synchronization of a wired network, or whether clock synchronization of a device is from reliable network listening, or whether a level of clock synchronization of a device is less than a set threshold, or whether precision of clock synchronization of a device is greater than a set threshold.

The synchronization information further includes a center carrier frequency position, acquired by the first device, of a frequency resource that is configured by the second device and that is used for transmission.

402: The first device determines a synchronization status between the first device and the second device according to the synchronization information of the second device.

The synchronization status refers to a time synchronization relationship between the first device and the second device, that is, whether the first device is synchronous with the second device in time, and the time synchronization relationship includes, but is not limited to, symbol synchronization, subframe synchronization, timeslot synchronization, and frame synchronization. The synchronization status further includes comparison of synchronization statuses of the first device and the second device, including comparison of synchronization precision of two devices, that is, which device has more reliable synchronization precision. The synchronization status further includes comparison of multiplexing manners of two devices, that is, whether both the first device and the second device use a time division duplex manner. The synchronization status further refers to a frequency synchronization relationship between the first device and the second device.

403: The first device performs determining according to the foregoing synchronization information, and does not adjust synchronization, where the first device is not synchronous with the second device; and sets a synchronization status of the first device.

The synchronization status refers to:

a clock of the first device is synchronous with a preset time, or clock synchronization of the first device is reliable, or a clock of the first device is from reliable network listening, or a level of clock synchronization of the first device is less than a set threshold, or precision of clock synchronization of the first device is greater than a set threshold.

404: The second device notifies the first device of a capability, of the second device, of configuring a frequency resource used to transmit data.

The capability, of the second device, of configuring a frequency resource refers to: the second device notifies the first device that the second device has a capability of configuring, according to the frequency resource configured by the first device, a frequency resource used to transmit data by the second device;

The step is completed under triggering of the first device; or automatically completed by the second device.

405: The first device configures a frequency resource close to a frequency edge, where the frequency resource is used to transmit data.

Specific steps are:

in a case in which the first device is not synchronous with the second device, when the second device can configure, according to the frequency resource configured by the first device, a frequency resource used to transmit data by the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1=|F_1-F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$;

a value of $F_1$ makes $G_1$ meet a condition $G_1<G_a$; or a maximum level of spurious emission of a signal of the first device is $L_1$, where a value of $L_1$ is characterized in that:

$L_1>L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$.

A beneficial effect of this embodiment is: Compared with a case in which the method is not used, by means of synchronization of the first device and the second device, a guard frequency band is reduced, so that more frequency resources are obtained, thereby improving a system capacity.

406: The first device notifies the second device of a frequency resource that is configured by the first device and that is used to transmit data.

Specific steps are: After the first device completes adjustment of a frequency resource used to transmit data, the first device notifies the second device that the first device is not in time synchronization with the second device, and the first device has configured a frequency resource close to an edge of a frequency band, where the frequency resource is used to transmit data, where the first device notifies the second device of a size and/or a position of frequency guard space reduced by the first device.

407: The second device configures a frequency resource far away from an edge of a frequency band, so as to avoid interference between the first device and the second device.

That after the second device receives a notification from the first device, the second device configures a frequency resource used to transmit data is characterized in that:

assuming that a frequency at a boundary between frequency bands of the first device and the second device is $F_B$, a frequency $F_2$ is a frequency raster, closest to $F_B$, in the frequency resource that is configured by the second device and that is used to transmit data, and a frequency distance to $F_B$ is $G_2=|F_2-F_B|$, where $F_2$ is characterized in that:

assuming that first user equipment and second user equipment communicate with the first device and the second device respectively, when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$; and a value of $F_2$ makes $G_2$ meet a condition $G_2>G_{a2}$.

408: After operations of step 201 to step 205 are completed, because a residual error in synchronization may exist, that is, time synchronization between the first device and the second device is not completely precise, in this case, the first device and/or the second device adjusts a start moment or an end moment of sending and/or receiving a signal, to further avoid interference between the devices.

A specific operation is: The first device adjusts a start position of sending a signal, to avoid a period during which the second device receives a signal; or the first device adjusts an end position of sending a signal, to avoid a period during which the second device receives a signal;

Alternatively, the second device adjusts a start position of receiving a signal, to avoid a period during which the first device sends a signal; or the second device adjusts an end position of receiving a signal, to avoid a period during which the first device sends a signal.

Compared with Embodiment 1 and Embodiment 2, a beneficial effect of this embodiment is: When the first device has relatively high synchronization precision, and the first device and the second device have a capability of coordinating a frequency resource configuration, the first device can still reduce a reserved guard space without changing time synchronization of the first device, and the reduction in the guard space is used to transmit data;

Compared with Embodiment 3, a beneficial effect of this embodiment is: in a case in which the first device and the second device fail to be completely synchronous, interference between the devices may be further effectively reduced by configuring a time of transmitting a signal and a time of receiving a signal.

Figure 5:
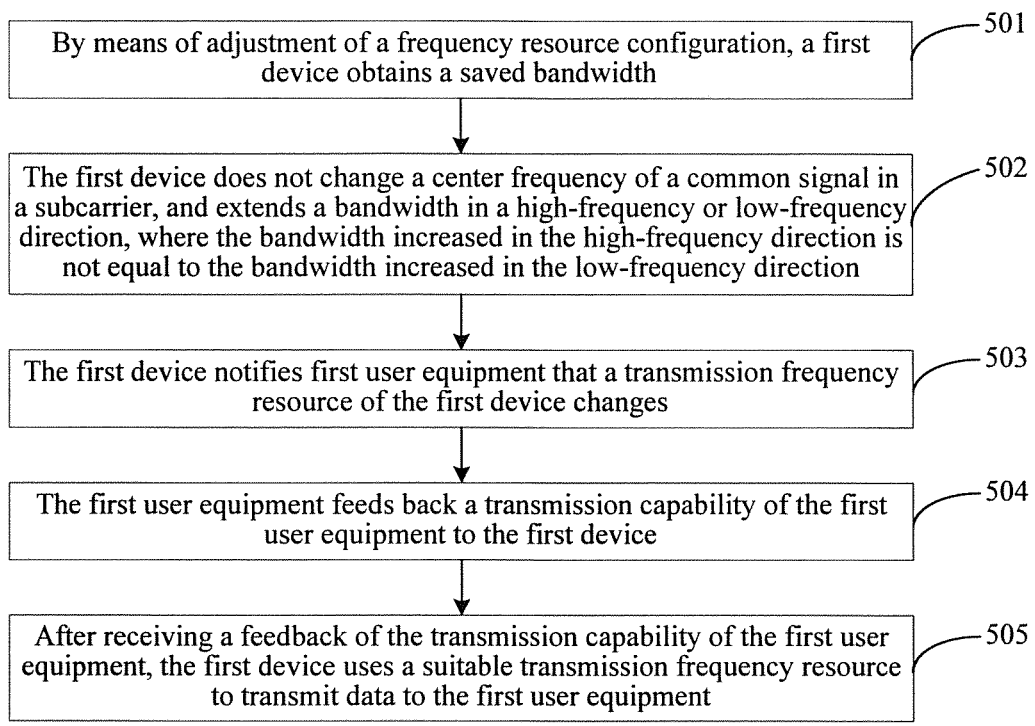
FIG. 5 is a schematic flowchart of a method for transmitting data by using a saved frequency resource according to an embodiment of the present invention.

An embodiment of the present invention provides a method for transmitting data by using a saved frequency resource. Referring to FIG. 5, the method includes the following steps:

After any one of Embodiment 1, 2, 3 or 4 is performed, a first device performs the following operations, to use a configured frequency resource.

501: By means of adjustment of a frequency resource configuration, a first device obtains a saved bandwidth.

The saved bandwidth is a saved frequency resource after a guard frequency band is adjusted. Assuming that when the first device is not synchronous with a second device, a minimum distance from an edge, of a frequency resource that is allocated by the first device and that is used to transmit data, to a boundary between frequency bands of the first device and the second device is $G_a$; and when the first device is synchronous with the second device, the minimum distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a-G_1$ is saved.

502: The first device extends a bandwidth in a high-frequency or low-frequency direction without changing a center frequency of a common signal in a subcarrier frequency, where the bandwidth increased in the high-frequency direction is not equal to the bandwidth increased in the low-frequency direction.

The common signal includes but is not limited to: a primary synchronization signal, a secondary synchronization signal, a broadcast signal or a reference signal.

Optionally, a center frequency of a common signal in a configured single carrier frequency or multiple carrier frequencies is an integer multiple of 300 KHz or an integer multiple of 100 KHz.

503: The first device notifies first user equipment of frequency resource information after a transmission frequency resource of the first device is extended.

A specific step is: A first sending unit notifies the first user equipment that a transmission frequency resource of the first device changes, including:

notifying the first user equipment of a center frequency of each carrier frequency, a bandwidth of a carrier frequency, and a quantity of carrier frequencies in carrier aggregation; or instructing, by the first device, the first user equipment to use one or more of a predefined center frequency of a carrier frequency or a bandwidth of a carrier frequency.

504: The first user equipment feeds back a transmission capability of the first user equipment to the first device.

The feeding back a transmission capability is that:

the first user equipment notifies the first device that the first user equipment can support transmission on a transmission frequency resource indicated by the first device; or the first user equipment notifies the first device that the first user equipment can partially support transmission on a transmission frequency resource indicated by the first device; or the first user equipment notifies the first device that the first user equipment cannot support transmission on a transmission frequency resource indicated by the first device.

In the foregoing description, when the first user equipment partially supports a transmission frequency resource indicated by the first device, the first user equipment indicates a position of a transmission frequency resource that the first user equipment can support and a size of the resource.

505: After receiving a feedback of the transmission capability of the first user equipment, the first device uses a transmission frequency resource that the first user equipment can support to transmit data to the first user equipment.

A suitable transmission frequency resource refers to a frequency resource that meets a capability of the first user equipment.

A beneficial effect of this embodiment is: An effective method is provided for the first device to use the frequency guard space that is saved by using the methods in Embodiments 1 to 4. In the method, a center frequency of a common signal does not need to be changed, and a saved guard space may be effectively utilized.

Figure 6:
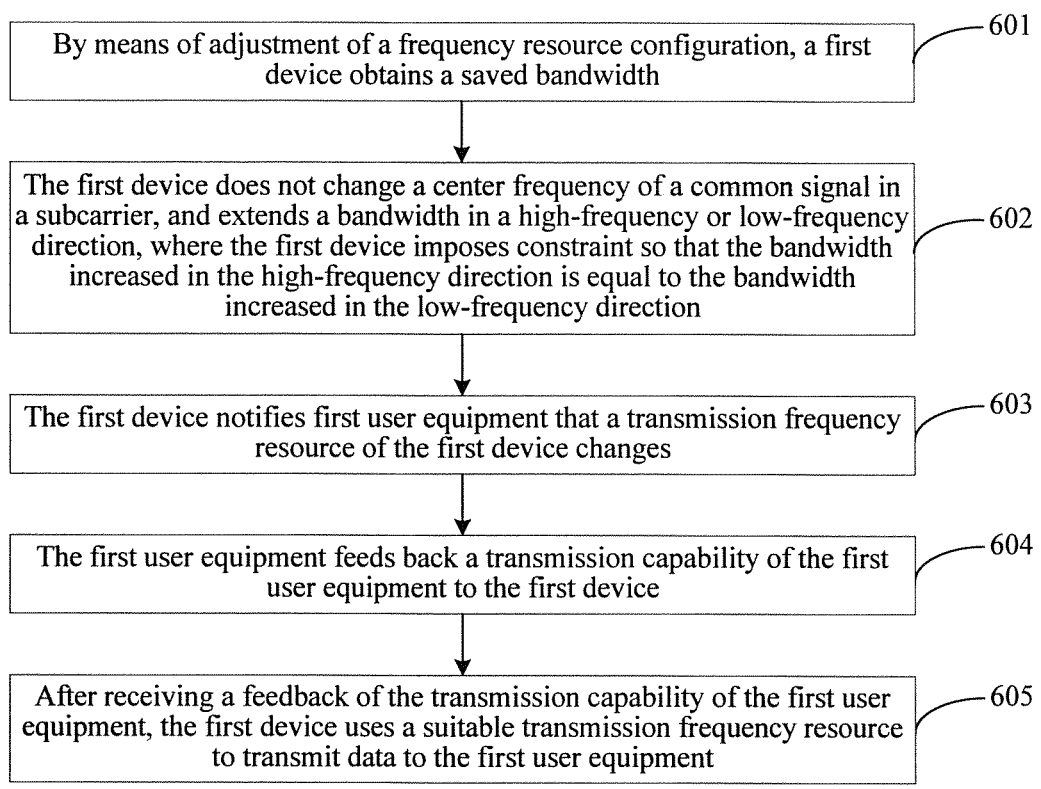
FIG. 6 is a schematic flowchart of another method for transmitting data by using a saved frequency resource according to an embodiment of the present invention.

An embodiment of the present invention provides a method for transmitting data by using a saved frequency resource. Referring to FIG. 6, the method includes the following steps:

601: By means of adjustment of a frequency resource configuration, a first device obtains a saved bandwidth.

The saved bandwidth is a frequency resource saved after a guard frequency band is adjusted. Assuming that when the first device is not synchronous with a second device, a minimum distance from an edge, of a frequency resource that is allocated by the first device and that is used to transmit data, to a boundary between frequency bands of the first device and the second device is $G_a$; and when the first device is synchronous with the second device, the minimum distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a - G_1$ is saved.

602: The first device extends a bandwidth in a high-frequency or low-frequency direction without changing a center frequency of a common signal in a subcarrier frequency, where the first device imposes constraint so that the bandwidth increased in the high-frequency direction is equal to the bandwidth increased in the low-frequency direction.

The common signal includes but is not limited to: a primary synchronization signal, a secondary synchronization signal, a broadcast signal, and a reference signal;

A center frequency of a common signal in a configured single carrier frequency or multiple carrier frequencies is an integer multiple of 300 KHz or 100 KHz.

603: The first device notifies first user equipment that a transmission frequency resource of the first device changes.

A specific step is: A first sending unit notifies the first user equipment of a transmission frequency resource of the first device changes, including:

notifying the first user equipment of a center frequency of each carrier frequency, a bandwidth of a carrier frequency, and a quantity of carrier frequencies in carrier aggregation; or instructing, by the first device, the first user equipment to use one or more of a predefined center frequency of a carrier frequency or a bandwidth of a carrier frequency.

604: The first user equipment feeds back a transmission capability of the first user equipment to the first device.

The fed-back transmission capability is that:

the first user equipment notifies the first device that the first user equipment can support transmission on a transmission frequency resource indicated by the first device; or the first user equipment notifies the first device that the first user equipment can partially support transmission on a transmission frequency resource indicated by the first device, where the first user equipment may indicate a position of a transmission frequency resource and a size of the resource that can be supported by the first user equipment; or the first user equipment notifies the first device that the first user equipment cannot support transmission on a transmission frequency resource indicated by the first device.

605: After receiving a feedback of the transmission capability of the first user equipment, the first device uses a suitable transmission frequency resource to transmit data to the first user equipment.

The suitable transmission frequency resource refers to a frequency resource that meets a capability of the first user equipment.

Compared with Embodiment 5, a beneficial effect of this embodiment is: after a frequency resource is extended, a frequency band structure maintains backward compatibility.

Figure 7:
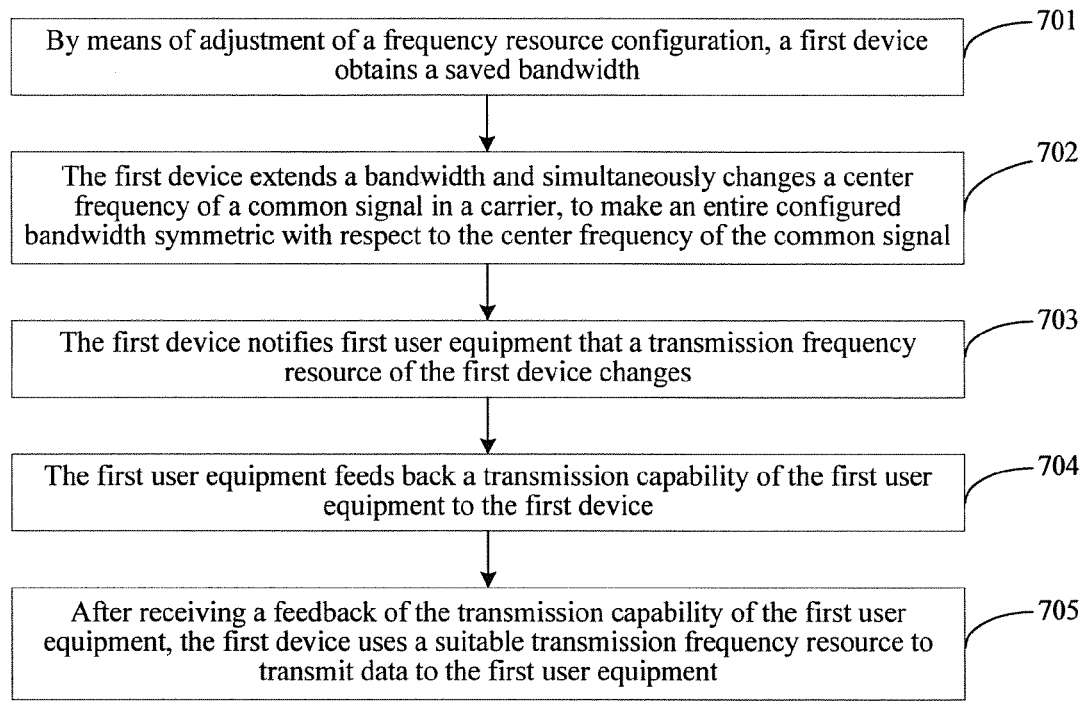
FIG. 7 is a schematic flowchart of still another method for transmitting data by using a saved frequency resource according to an embodiment of the present invention.

An embodiment of the present invention provides a method for transmitting data by using a saved frequency resource. Referring to FIG. 7, the method includes the following steps:

701: By means of adjustment of a frequency resource configuration, a first device obtains a saved bandwidth.

The saved bandwidth is a frequency resource saved after a guard frequency band is adjusted. Assuming that when the first device is not synchronous with a second device, a minimum distance from an edge, of a frequency resource that is allocated by the first device and that is used to transmit data, to a boundary between frequency bands of the first device and the second device is $G_a$; and when the first device is synchronous with the second device, the minimum distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a$-$G_1$ is saved.

702: The first device extends a bandwidth and changes a center frequency of a common signal in a carrier frequency, to make an entire configured bandwidth symmetric with respect to the center frequency of the common signal.

The common signal includes but is not limited to: a primary synchronization signal, a secondary synchronization signal, a broadcast signal, and a reference signal.

A center frequency of a common signal in a configured single carrier frequency or multiple carrier frequencies is an integer multiple of 300 KHz or 100 KHz.

703: The first device notifies first user equipment that a transmission frequency resource of the first device changes.

A specific step is: A first sending unit notifies the first user equipment of a transmission frequency resource of the first device changes, including:

notifying the first user equipment of a center frequency of each carrier frequency, a bandwidth of a carrier frequency, and a quantity of carrier frequencies in carrier aggregation; or instructing, by the first device, the first user equipment to use one or more of a predefined center frequency of a carrier frequency or a bandwidth of a carrier frequency.

704: The first user equipment feeds back a transmission capability of the first user equipment to the first device.

The fed-back transmission capability is that:

the first user equipment notifies the first device that the first user equipment can support transmission on a transmission frequency resource indicated by the first device; or the first user equipment notifies the first device that the first user equipment can partially support transmission on a transmission frequency resource indicated by the first device, where the first user equipment may indicate a position of a transmission frequency resource and a size of the resource that can be supported by the first user equipment; or the first user equipment notifies the first device that the first user equipment cannot support transmission on a transmission frequency resource indicated by the first device.

705: After receiving a feedback of the transmission capability of the first user equipment, the first device uses a suitable transmission frequency resource to transmit data to the first user equipment.

The suitable transmission frequency resource refers to a frequency resource that meets a capability of the first user equipment.

Compared with Embodiments 5 and 6, a beneficial effect of this embodiment is: A frequency resource is configured more flexibly, and a center frequency of a common signal of a frequency band after extension may be adjusted.

Figure 8:
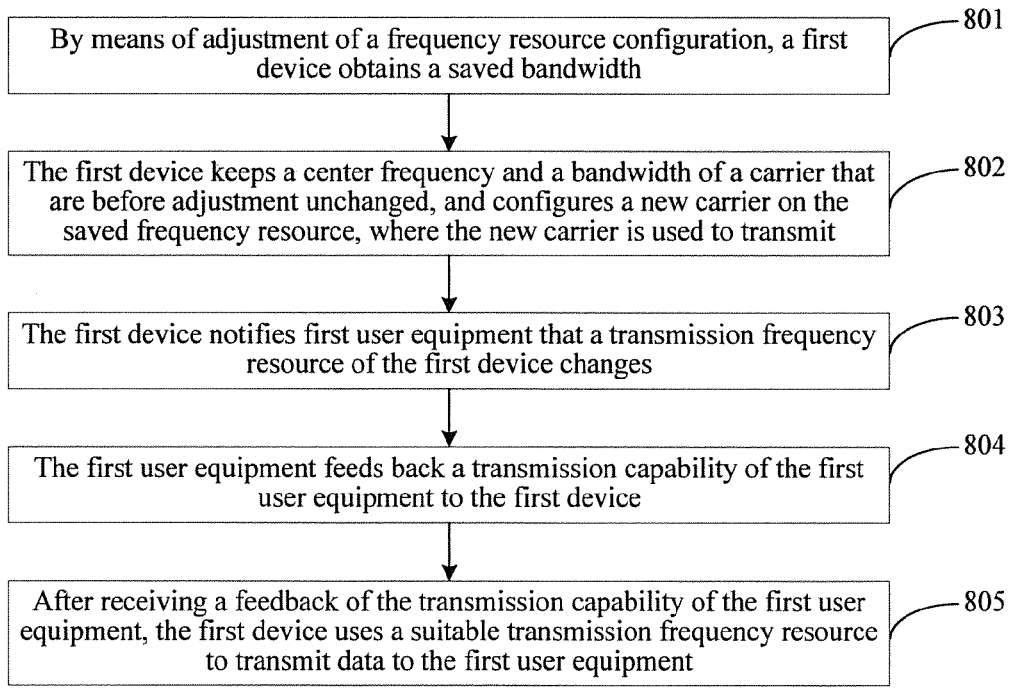
FIG. 8 is a schematic flowchart of yet another method for transmitting data by using a saved frequency resource according to an embodiment of the present invention.

An embodiment of the present invention provides a method for transmitting data by using a saved frequency resource. Referring to FIG. 8, the method includes the following steps:

801: By means of adjustment of a frequency resource configuration, a first device obtains a saved bandwidth.

The saved bandwidth is a frequency resource saved after a guard frequency band is adjusted. Assuming that when the first device is not synchronous with a second device, a minimum distance from an edge, of a frequency resource that is allocated by the first device and that is used to transmit data, to a boundary between frequency bands of the first device and the second device is $G_a$; and when the first device is synchronous with the second device, the minimum distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a$-$G_1$ is saved.

802: The first device keeps a center frequency and a bandwidth of a carrier frequency that are before adjustment unchanged, configures a new carrier frequency on the saved frequency resource, where the new carrier frequency is used to transmit data, where adjustment refers to synchronization adjustment by the first device according to synchronization information of the second device, and configuring the saved frequency resource to be used to transmit data.

A center frequency of a common signal in a configured single carrier frequency or multiple carrier frequencies is an integer multiple of 300 KHz or 100 KHz.

803: The first device notifies first user equipment that a transmission frequency resource of the first device changes.

A specific step is: A first sending unit notifies the first user equipment of a transmission frequency resource of the first device changes, including:

notifying the first user equipment of a center frequency of each carrier frequency, a bandwidth of a carrier frequency, and a quantity of carrier frequencies in carrier aggregation; or instructing, by the first device, the first user equipment to use one or more of a predefined center frequency of a carrier frequency or a bandwidth of a carrier frequency.

804: The first user equipment feeds back a transmission capability of the first user equipment to the first device.

The fed-back transmission capability is that:

the first user equipment notifies the first device that the first user equipment can support transmission on a transmission frequency resource indicated by the first device; or the first user equipment notifies the first device that the first user equipment can partially support transmission on a transmission frequency resource indicated by the first device, where the first user equipment may indicate a position of a transmission frequency resource and a size of the resource that can be supported by the first user equipment; or the first user equipment notifies the first device that the first user equipment cannot support transmission on a transmission frequency resource indicated by the first device.

805: After receiving a feedback of the transmission capability of the first user equipment, the first device uses a suitable transmission frequency resource to transmit data to the first user equipment.

The suitable transmission frequency resource refers to a frequency resource that meets a capability of the first user equipment.

Compared with Embodiments 5 and 6, a beneficial effect of this embodiment is: a carrier aggregation technology is used, so that a frequency resource that exceeds a maximum supported bandwidth of one carrier frequency can be effective utilized.

Figure 9:
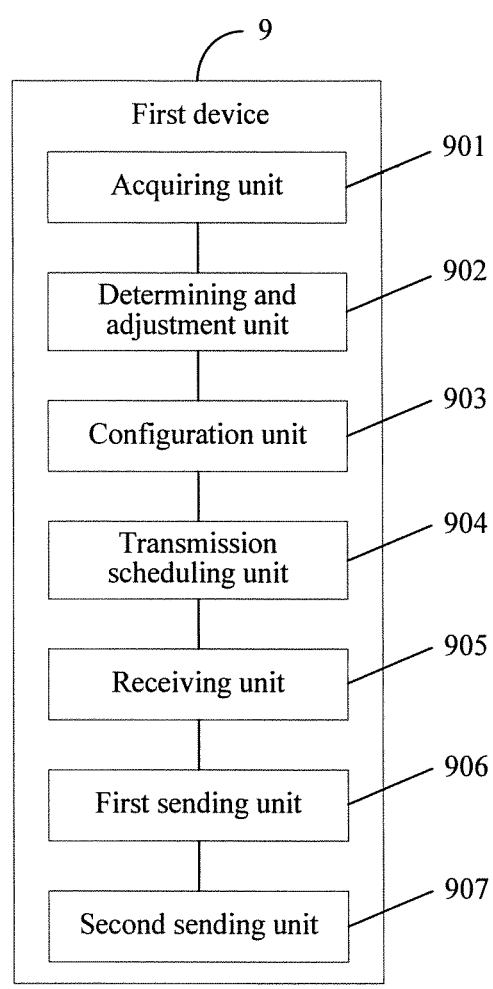
FIG. 9 is a schematic structural diagram of a virtual device of a first device according to an embodiment of the present invention.

An embodiment of the present invention provides a first base station 9. Referring to FIG. 9, the first base station 9 includes: an acquiring unit 901, a determining and adjustment unit 902, a configuration unit 903, a transmission scheduling unit 904, a receiving unit 905, a first sending unit 906, and a second sending unit 907.

The acquiring unit 901 is configured to acquire synchronization information of a second device.

The synchronization information includes: timing information of the second device, or indication information for at least one of the following synchronization statuses:
whether a device is synchronous with a preset time, or
whether clock synchronization of a device is reliable, or
whether clock synchronization of a device is directly from a global navigation satellite system, or
whether clock synchronization of a device is directly from clock synchronization of a wired network, or
whether clock synchronization of a device is from reliable network listening, or
whether a level of clock synchronization of a device is less than a set threshold, or
whether precision of clock synchronization of a device is greater than a set threshold.

The synchronization information further includes: a center carrier frequency position, acquire by a first device, of a frequency resource that is configured by the second device and that is used for transmission.

The determining and adjustment unit 902 is configured to determine a synchronization status between the first device and the second device according to the synchronization information of the second device; and adjust a synchronization relationship between the first device and the second device, and set a synchronization status of the first device.

A specific function is:
when the second device is synchronous with a preset time, or
clock synchronization of the second device is reliable, or
clock synchronization of the second device is directly from a global navigation satellite system, or
clock synchronization of the second device is directly from time synchronization of a wired network, or
clock synchronization of the second device is from reliable network listening, or
a level of clock synchronization of the second device is less than a set threshold, or
precision of clock synchronization of the second device is greater than a set threshold, or
the first device adjusts timing according to a time of the second device, to implement clock synchronization between the first device and the second device.

In addition, in the function unit, the synchronization status refers to:
a clock of the first device is synchronous with a preset time, or
clock synchronization of the first device is reliable, or
a clock of the first device is from reliable network listening, or
a level of clock synchronization of the first device is less than a set threshold, or
precision of clock synchronization of the first device is greater than a set threshold.

The configuration unit 903 is configured to configure a frequency resource close to an edge of a frequency band according to the synchronization information of the second device that is output by a determining and a adjustment unit, where the frequency resource is used to transmit data.

First, the configuration unit has two feasible operations to adjust a position of a frequency resource used to transmit data:
in a case in which the first device is synchronous with the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1=|F_1-F_B|$, where $F_1$ is characterized in that:
assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and
a value of $F_1$ makes $G_1$ meet a condition $G_1<G_a$, where when the first device and the second device both use a time division duplex technology, the first device and the second device use a same uplink-downlink subframe configuration.

Alternatively,
in a case in which the first device is not synchronous with the second device, when the second device can configure, according to the frequency resource configured by the first device, a frequency resource used to transmit data by the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1=|F_1-F_B|$, where $F_1$ is characterized in that:
assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and
a value of $F_1$ makes $G_1$ meet a condition $G_1<G_a$, where in the foregoing two operations, a value of $G_1$ is 0; or a value of $G_1$ is selected from multiple values, where the multiple values are predefined values, where the multiple values correspond to multiple types of synchronization precision that the first device can reach with respect to the second device; or the multiple values correspond to multiple combinations of respective synchronization statuses of the first device and the second device.

An effect of the function unit is that an allowable level of spurious emission of a signal of the first device is increased. It is specifically represented that a maximum level of spurious emission of a signal of the first device is $L_1$, where a value of $L_1$ is characterized in that:
$L_1>L_a$, where $L_a$ is characterized in that: assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$.

Next, the configuration unit adjusts a start position of sending a signal, to avoid a period during which the second device receives a signal; or the first device adjusts an end position of sending a signal, to avoid a period during which the second device receives a signal.

The transmission scheduling unit 904 is configured to schedule and use the configured frequency resource to transmit data.

A specific function is that the sending unit of the first device transmits data by using a saved frequency resource, where the saved frequency resource is characterized in that:

assuming that when the first device is not synchronous with the second device, a minimum distance from an edge, of a frequency resource that is allocated by the first device and that is used to transmit data, to a boundary between frequency bands of the first device and the second device is $G_a$; and when the first device is synchronous with the second device, the minimum distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a-G_1$ is saved.

A manner in which the first device uses the saved frequency resource includes:

configuring a carrier frequency, and extending a bandwidth of a carrier frequency to transmit data by using the saved frequency resource; or configuring multiple carrier frequencies, and utilizing carrier aggregation to use the saved frequency resource.

A manner of using a carrier frequency includes:

the first device extends a bandwidth in a high-frequency or low-frequency direction without changing a center frequency of a common signal in a carrier frequency, where the extending a bandwidth in a high-frequency or low-frequency direction is characterized in that: the bandwidth increased in the high-frequency direction by the first device is not equal to the bandwidth increased in the low-frequency direction, or the first device imposes constraint so that the bandwidth increased in the high-frequency direction is equal to the bandwidth increased in the low-frequency direction; or the first device extends a bandwidth and changes a center frequency of a common signal in a carrier frequency, to make an entire configured bandwidth symmetric with respect to the center frequency of the common signal.

The common signal includes but is not limited to: a primary synchronization signal, a secondary synchronization signal, a broadcast signal, and a reference signal.

A manner of using multiple carrier frequencies and utilizing carrier aggregation to use the saved frequency resource includes:

the configuring multiple carrier frequencies is further characterized in that: the first device keeps a center frequency and a bandwidth of a carrier frequency that are before adjustment unchanged, configures a new carrier frequency on the saved frequency resource, where the new carrier frequency is used to transmit data, where the adjustment refers to synchronization adjustment by the first device according to synchronization information of the second device, and configuring the saved frequency resource to be used to transmit data.

A center frequency of a common signal of the foregoing configured single carrier frequency or multiple carrier frequencies is an integer multiple of 300 KHz or 100 KHz.

The receiving unit 905 is configured to receive feedback information of the first user equipment, where the feedback information is a fed-back receiving capability of the first user equipment.

The receiving capability of the first user equipment includes:

the first user equipment notifies the first device that the first user equipment can support transmission on a transmission frequency resource indicated by the first device; or the first user equipment notifies the first device that the first user equipment can partially support transmission on a transmission frequency resource indicated by the first device, where the first user equipment may indicate a position of a transmission frequency resource and a size of the resource that can be supported by the first user equipment; or the first user equipment notifies the first device that the first user equipment cannot support transmission on a transmission frequency resource indicated by the first device.

The first sending unit 906 is configured to notify the first user equipment that a transmission frequency resource of the first device changes.

The notifying, by the first sending unit, the first user equipment that a transmission frequency resource of the first device changes includes:

notifying the first user equipment of a center frequency of each carrier frequency, a bandwidth of a carrier frequency, and a quantity of carrier frequencies in carrier aggregation; or instructing, by the first device, the first user equipment to use one or more of a predefined center frequency of a carrier frequency or a bandwidth of a carrier frequency.

The second sending unit 907 is configured to: when the first device is not synchronous with the second device, notify the second device that the first device is not in time synchronization with the second device, and the first device has configured a frequency resource close to an edge of a frequency band, where the frequency resource is used to transmit data.

Figure 10:
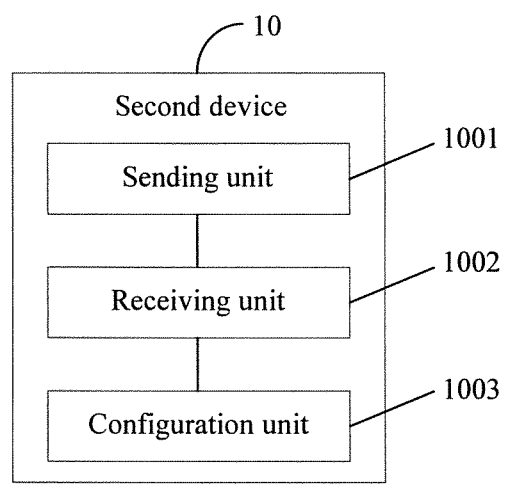
FIG. 10 is a schematic structural diagram of a virtual device of a second device according to an embodiment of the present invention.

An embodiment of the present invention provides a second device 10. Referring to FIG. 10, the second device 10 includes: a sending unit 1001, a receiving unit 1002, and a configuration unit 1003.

The sending unit 1001 is configured to notify a first device that the second device has a capability of configuring, according to a frequency resource configured by the first device, a frequency resource used to transmit data by the second device.

The receiving unit 1002 is configured to receive notification information from the first device, where when the first device is not synchronous with the second device, the first device notifies the second device that the first device is not in time synchronization with the second device, and the first device has configured a frequency resource close to an edge of a frequency band, where the frequency resource is used to transmit data.

The configuration unit 1003 is configured to: after the notification of the first device is received, configure, by the second device, a frequency resource used to transmit data.

After the notification of the first device is received, the configuration unit configures, by the second device, a frequency resource used to transmit data, where assuming that a frequency at a boundary between frequency bands of the first device and the second device is $F_B$, a frequency $F_2$ is a frequency raster, closest to $F_B$, in a frequency resource that is configured by the second device and that is used to transmit data, and a frequency distance to $F_B$ is $G_2=|F_2-F_B|$, where $F_2$ is characterized in that:

assuming that first user equipment and second user equipment communicate with the first device and the second device respectively, when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$; and a value of $F_2$ makes $G_2$ meet a condition $G_2>G_{a2}$.

An effect of the function unit is that a maximum level of spurious emission of a signal of the second device is $L_2$, where a value of $L_2$ is characterized in that:

$L_2 < L_{a2}$, where $L_{a2}$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_{a2}$;

that the configuration unit is configured to configure a position of a frequency resource used to transmit data is further characterized in that:

the second device adjusts a start position of receiving a signal, to avoid a period during which the first device sends a signal; or the second device adjusts an end position of receiving a signal, to avoid a period during which the first device sends a signal.

Figure 11:
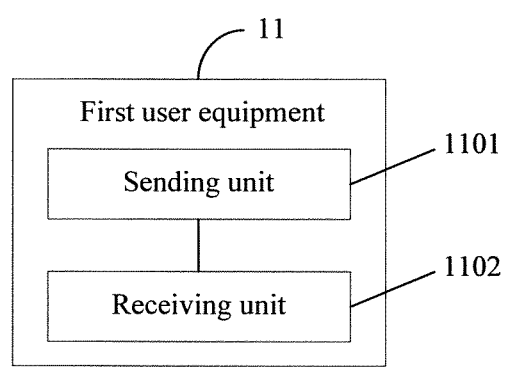
FIG. 11 is a schematic structural diagram of a virtual device of the first user equipment according to an embodiment of the present invention.

An embodiment of the present invention provides first user equipment 11. Referring to FIG. 11, the first user equipment 11 includes: a sending unit 1101 and a receiving unit 1102.

The receiving unit 1102 is configured to receive a notification from a first device, and obtain information about a center frequency of each carrier frequency, a bandwidth of a carrier frequency, and a quantity of carrier frequencies in carrier aggregation; or receive a notification from the first device, and obtain information about that one or more of a predefined center frequency of a carrier frequency or a bandwidth of a carrier frequency are used for each carrier frequency.

The sending unit 110 is configured to: after a notification notifying that a transmission frequency resource of the first device changes is received, need to feed back a transmission capability of the first user equipment to the first device.

The first device is notified that the first user equipment can support transmission on a transmission frequency resource indicated by the first device; or the first device is notified that the first user equipment can partially support transmission on a transmission frequency resource indicated by the first device, where the first user equipment may indicate a position of a transmission frequency resource and a size of the resource that can be supported by the first user equipment; or the first device is notified that the first user equipment cannot support transmission on a transmission frequency resource indicated by the first device.

Figure 12:
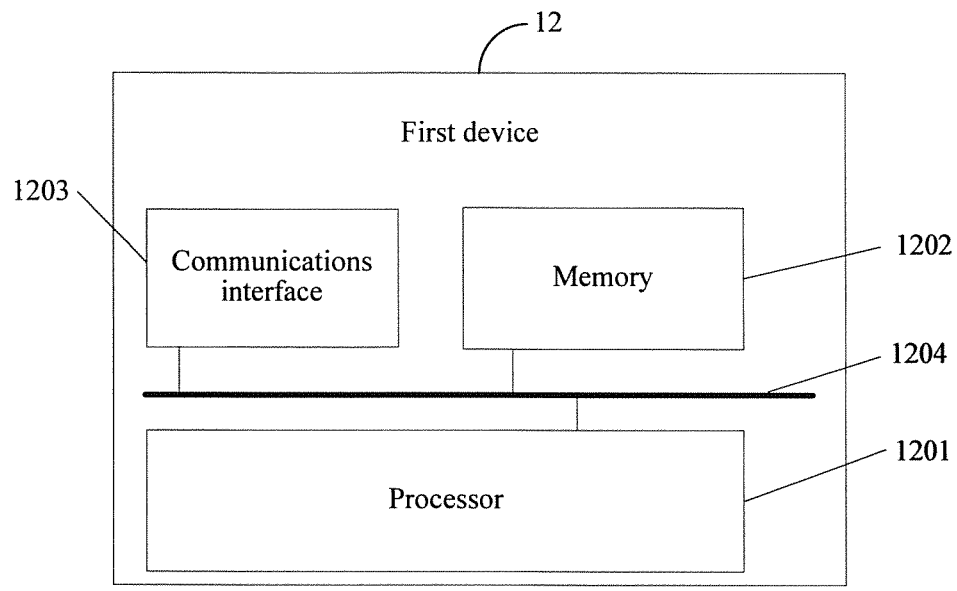
FIG. 12 is a schematic structural diagram of a physical device of a first device according to an embodiment of the present invention.

An embodiment of the present invention provides a first device 12. Referring to FIG. 12, the first device 12 includes: at least one processor 1201, a memory 1202, a communications interface 1203, and a bus 1204. The at least one processor 1201, the memory 1202, and the communications interface 1203 are connected to and communicate with each other by using the bus 1204.

The bus 1204 may be an Industry Standard Architecture (Industry Standard Architecture, ISA for short) bus, a peripheral component interconnect (Peripheral Component Interconnect, PCI for short) bus, an Extended Industry Standard Architecture (Extended Industry Standard Architecture, EISA for short) bus, or the like. The bus 1204 may be classified as an address bus, a data bus, a control bus, or the like. For ease of representation, in FIG. 12, the bus 1204 is represented by only one thick line, but it does not represent that there is only one bus or one type of bus.

The memory 1202 is configured to store executable program code, where the program code includes a computer operation instruction. The memory 1202 may include a high-speed RAM memory, and may further include a non-volatile memory (non-volatile memory), such as at least one magnetic disk memory.

The processor 1201 may be a central processing unit (Central Processing Unit, CPU for short) or an application-specific integrated circuit (Application Specific Integrated Circuit, ASIC for short), or is configured as one or more integrated circuits that implement this embodiment of the present invention.

The communications interface 1203 is mainly configured to implement communication between an AP, a first STA, a second STA, and a third STA in this embodiment.

The processor 1201 is further configured to invoke the program code in the memory 1202, so as to perform the following operations:

acquiring synchronization information of a second device by using at least one communications interface.

The synchronization information of the second device includes: timing information of the second device, or indication information for at least one of the following synchronization statuses:

whether a device is synchronous with a preset time, or whether clock synchronization of a device is reliable, or whether clock synchronization of a device is directly from a global navigation satellite system, or whether clock synchronization of a device is directly from clock synchronization of a wired network, or whether clock synchronization of a device is from reliable network listening, or whether a level of clock synchronization of a device is less than a set threshold, or whether precision of clock synchronization of a device is greater than a set threshold.

The synchronization information of the second device further includes a center carrier frequency position, acquired by the first device, of a frequency resource that is configured by the second device and that is used for transmission.

A method in which the processor is configured to acquire the timing information of the second device or information about the center carrier frequency position of the second device includes: searching for and receiving, by the first device, a synchronization reference signal sent by the second device, and processing the reference signal, to obtain the synchronization information; or receiving, by the first device in a wired manner, a signal sent by the second device to obtain the synchronization information; or obtaining, by the first device, the timing information of the second device or information about a center frequency position of the second device by using a center controller.

The processor is configured to: when the second device is synchronous with a preset time, or clock synchronization of the second device is reliable, or clock synchronization of the second device is directly from a global navigation satellite system, or clock synchronization of the second device is directly from time synchronization of a wired network, or clock synchronization of the second device is from reliable network listening, or a level of clock synchronization of the second device is less than a set threshold, or precision of clock synchronization of the second device is greater than a set threshold, adjust timing according to a time of the second device, to implement clock synchronization between the first device and the second device; and adjust timing according to a time of the second device, and set a synchronization status of the first device to be that: a clock of the first device is synchronous with a preset time, or clock synchronization of the first device is reliable, or clock synchronization of the first device is directly from a global navigation satellite system, or clock synchronization of the first device is directly from time synchronization of a wired network, or a clock of the first device is from reliable network listening, or a level of clock synchronization of the first device is less than a set threshold, or precision of clock synchronization of the first device is greater than a set threshold.

A frequency resource close to an edge of a frequency band is configured according to the synchronization information of the second device, where the frequency resource is used to transmit data.

In a case in which the first device is synchronous with the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1 = |F_1 - F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a = |F_a - F_B|$; and a value of $F_1$ makes $G_1$ meet a condition $G_1 < G_a$, where when the first device and the second device both use a time division duplex technology, it is set that the first device and the second device use a same uplink-downlink subframe configuration.

In a case in which the first device is not synchronous with the second device, when the second device can configure, according to the frequency resource configured by the first device, a frequency resource used to transmit data by the second device, assuming that a frequency at a boundary between frequency bands of the first device and the second device is $F_B$, and a frequency $F_1$ is a frequency raster, closest to $F_B$, in the frequency resource that is configured by the first device and that is used to transmit data, a frequency distance to $F_B$ is $G_1 = |F_1 - F_B|$, where $F_1$ is characterized in that:

assuming that first user equipment and second user equipment communicate with the first device and the second device respectively, when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a = |F_a - F_B|$; and a value of $F_1$ makes $G_1$ meet a condition $G_1 < G_a$, where a value, of $G_1$, set by the processor includes: the value of $G_1$ is 0; or the value of $G_1$ is selected from multiple values, where the multiple values are predefined values, where multiple values correspond to multiple types of synchronization precision that the first device can reach with respect to the second device; or the multiple values correspond to multiple combinations of respective synchronization statuses of the first device and the second device.

That the processor of the first device configures a position of a frequency resource used to transmit data is characterized in that: a maximum level of spurious emission of a signal of the first device is $L_1$, where a value of $L_1$ is characterized in that:

$L_1 > L_a$, where $L_a$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_a$, where the foregoing case in which uplink-to-downlink interference exists between any first user equipment and any second user equipment includes: the first device is not synchronous with the second device; or the first device is synchronous with the second device, and the first device and the second device use different multiplexing technologies, or use different uplink-downlink subframe configurations.

A communications interface is scheduled and used, and the configured frequency resource is scheduled and used to transmit data.

The processor schedules and uses a saved frequency resource to transmit data, where the saved frequency resource is characterized in that:

assuming that when the first device is not synchronous with the second device, a minimum distance from an edge, of a frequency resource that is allocated by the first device and that is used to transmit data, to a boundary between frequency bands of the first device and the second device is $G_a$; and when the first device is synchronous with the second device, the minimum distance from the edge, of the frequency resource that is allocated by the first device and that is used to transmit data, to the boundary between the frequency bands of the first device and the second device is $G_1$; in a case in which the first device is synchronous with the second device, the first device configures $G_1$, so that a frequency resource with a total bandwidth of $G_a - G_1$ is saved.

A manner in which the processor of the first device schedules and uses a saved frequency resource includes: configuring a carrier frequency, and extending a bandwidth of a carrier frequency to transmit data by using the saved frequency resource; or configuring multiple carrier frequencies, and utilizing carrier aggregation to use the saved frequency resource, where a manner in which the first device uses the saved frequency resource includes:

configuring a carrier frequency, and extending a bandwidth of a carrier frequency to transmit data by using the saved frequency resource; or configuring multiple carrier frequencies, and utilizing carrier aggregation to use the saved frequency resource.

A manner of using a carrier frequency includes:

the first device extends a bandwidth in a high-frequency or low-frequency direction without changing a center frequency of a common signal in a carrier frequency, where the extending a bandwidth in a high-frequency or low-frequency direction is characterized in that: the bandwidth increased in the high-frequency direction by the first device is not equal to the bandwidth increased in the low-frequency direction, or the first device imposes constraint so that the bandwidth increased in the high-frequency direction is equal to the bandwidth increased in the low-frequency direction; or the first device extends a bandwidth and changes a center frequency of a common signal in a carrier frequency, to make an entire configured bandwidth symmetric with respect to the center frequency of the common signal.

The common signal includes but is not limited to: a primary synchronization signal, a secondary synchronization signal, a broadcast signal, and a reference signal.

A manner of using multiple carrier frequencies and utilizing carrier aggregation to use the saved frequency resource includes:

the configuring multiple carrier frequencies is further characterized in that: the first device keeps a center frequency and a bandwidth of a carrier frequency that are before adjustment unchanged, configures a new carrier frequency on the saved frequency resource, where the new carrier frequency is used to transmit data, where the adjustment refers to synchronization adjustment by the first device according to synchronization information of the second device, and configuring the saved frequency resource to be used to transmit data.

A center frequency of a common signal of the foregoing configured single carrier frequency or multiple carrier frequencies is an integer multiple of 300 KHz or 100 KHz.

The first user equipment is notified, by using the at least one communications interface, that a transmission frequency resource of the first device changes, where the transmission frequency resource includes: a center frequency of each carrier frequency, a bandwidth of a carrier frequency, a quantity of carrier frequencies in carrier aggregation; or the first device instructs the first user equipment to use one or more of a predefined center frequency of a carrier frequency or a bandwidth of a carrier frequency.

Feedback information of the first user equipment is received by using the at least one communications interface, where the feedback information is a fed-back receiving capability of the first user equipment.

When the first device is not synchronous with the second device, the second device is notified, by using the at least one communications interface, that the first device is not in time synchronization with the second device, and the first device has configured a frequency resource close to an edge of a frequency band, where the frequency resource is used to transmit data.

Figure 13:
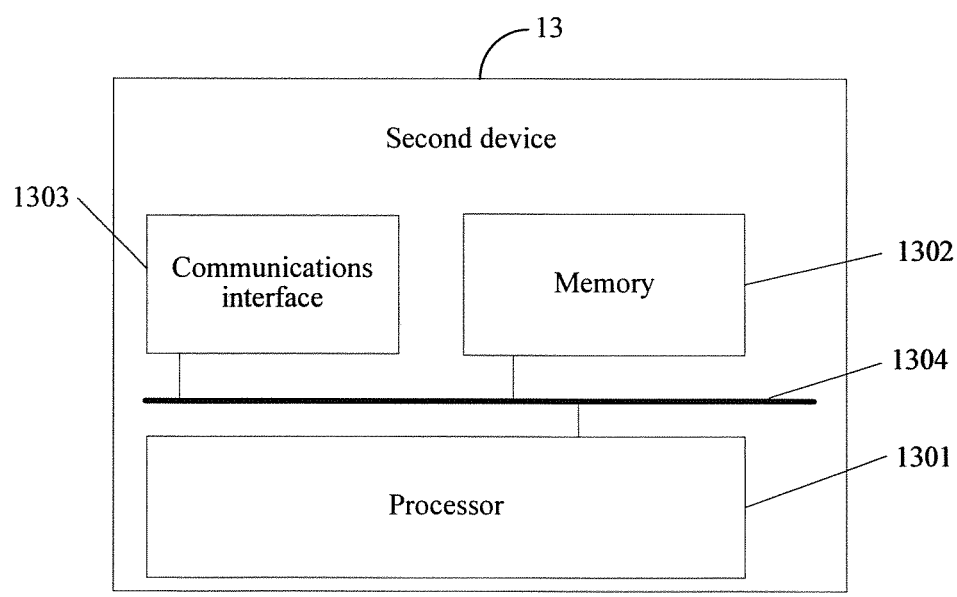
FIG. 13 is a schematic structural diagram of a physical device of a second device according to an embodiment of the present invention.

An embodiment of the present invention provides a second device 13. Referring to FIG. 13, the second device 13 includes: at least one processor 1301, a memory 1302, a communications interface 1303, and a bus 1304. The at least one processor 1301, the memory 1302, and the communications interface 1303 are connected to and communicate with each other by using the bus 1304.

The bus 1304 may be an Industry Standard Architecture (Industry Standard Architecture, ISA for short) bus, a peripheral component interconnect (Peripheral Component Interconnect, PCI for short) bus, an Extended Industry Standard Architecture (Extended Industry Standard Architecture, EISA for short) bus, or the like. The bus 1304 may be classified as an address bus, a data bus, a control bus, or the like. For ease of representation, in FIG. 13, the bus 1304 is represented by only one thick line, but it does not represent that there is only one bus or one type of bus.

The memory 1302 is configured to store executable program code, where the program code includes a computer operation instruction. The memory 1302 may include a high-speed RAM memory, and may further include a non-volatile memory (non-volatile memory), such as at least one magnetic disk memory.

The processor 1301 may be a central processing unit (Central Processing Unit, CPU for short) or an application-specific integrated circuit (Application Specific Integrated Circuit, ASIC for short), or is configured as one or more integrated circuits that implement this embodiment of the present invention.

The communications interface 1303 is mainly configured to implement communication between an AP, a first STA, a second STA, and a third STA in this embodiment.

The processor 1301 is further configured to invoke the program code in the memory 1302, so as to perform the following operations:

notifying, by using at least one communications interface, a first device that the second device has a capability of configuring, according to a frequency resource configured by the first device, a frequency resource used to transmit data by the second device; and receiving, by using the at least one communications interface, a notification from the first device, where when the first device is not synchronous with the second device, the first device notifies the second device that the first device is not in time synchronization with the second device, and the first device has configured a frequency resource close to an edge of a frequency band, where the frequency resource is used to transmit data.

After the notification of the first device is received, the configuring a frequency resource used to transmit data is characterized in that:

assuming that a frequency at a boundary between frequency bands of the first device and the second device is $F_B$, a frequency $F_2$ is a frequency raster, closest to $F_B$, in a frequency resource that is configured by the second device and that is used to transmit data, and a frequency distance to $F_B$ is $G_2=|F_2-F_B|$, where $F_2$ is characterized in that:

assuming that first user equipment and second user equipment communicate with the first device and the second device respectively, when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$; and a value of $F_2$ makes $G_2$ meet a condition $G_2 > G_{a2}$.

That the processor configures a position of a frequency resource used to transmit data is further characterized in that: a maximum level of spurious emission of a signal of the second device is $L_2$, where a value of $L_2$ is characterized in that:

$L_2 < L_{a2}$, where $L_{a2}$ is characterized in that:

assuming that first user equipment and second user equipment communicate with the first device and the second device respectively, when uplink-to-downlink interference exists between any first user equipment and any second user equipment, a maximum level of spurious emission inside a measurement bandwidth at an edge of a frequency band of a first device meeting a coexistence requirement is $L_{a2}$.

That the processor of the second device configures a position of a frequency resource used to transmit data is further characterized in that: the second device adjusts a start position of receiving a signal, to avoid a period during which the first device sends a signal; or the second device adjusts an end position of receiving a signal, to avoid a period during which the first device sends a signal.

The foregoing case in which uplink-to-downlink interference exists between any first user equipment and any second user equipment includes: the first device is not synchronous with the second device; or the first device is synchronous with the second device, and the first device and the second device use different multiplexing technologies, or use different uplink-downlink subframe configurations.

After the notification of the first device is received, the processor configures a frequency resource used to transmit data.

Figure 14:
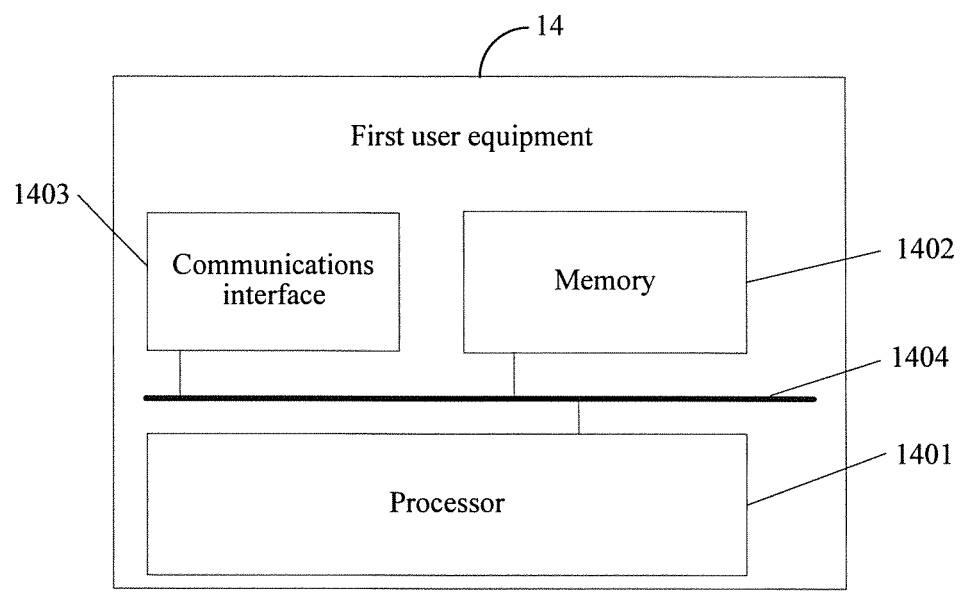
FIG. 14 is a schematic structural diagram of a physical device of the first user equipment according to an embodiment of the present invention.

An embodiment of the present invention provides first user equipment 14. Referring to FIG. 14, the first user equipment 14 includes: at least one processor 1401, a memory 1402, a communications interface 1403, and a bus 1404. The at least one processor 1401, the memory 1402, and the communications interface 1403 are connected to and communicate with each other by using the bus 1404.

The bus 1404 may be an Industry Standard Architecture (Industry Standard Architecture, ISA for short) bus, a peripheral component interconnect (Peripheral Component Interconnect, PCI for short) bus, an Extended Industry Standard Architecture (Extended Industry Standard Architecture, EISA for short) bus, or the like. The bus 1404 may be classified as an address bus, a data bus, a control bus, or the like. For ease of representation, in FIG. 14, the bus 1401 is represented by only one thick line, but it does not represent that there is only one bus or one type of bus.

The memory 1402 is configured to store executable program code, where the program code includes a computer operation instruction. The memory 1402 may include a high-speed RAM memory, and may further include a non-volatile memory (non-volatile memory), such as at least one magnetic disk memory.

The processor 1401 may be a central processing unit (Central Processing Unit, CPU for short) or an application-specific integrated circuit (Application Specific Integrated Circuit, ASIC for short), or is configured as one or more integrated circuits that implement this embodiment of the present invention.

The communications interface 1403 is mainly configured to implement communication between an AP, a first STA, a second STA, and a third STA in this embodiment.

The processor 1401 is further configured to invoke the program code in memory 1402, so as to perform the following operations:

The processor is configured to invoke the program code in the memory, so as to perform the following operations:

receiving a notification from a first device by using at least one communications interface, where the notification notifies the first user equipment that a transmission frequency resource of the first device changes, where the transmission frequency resource includes: information about a center frequency of each carrier frequency, a bandwidth of a carrier frequency, and a quantity of carrier frequencies in carrier aggregation; or information about that one or more of a predefined center frequency of a carrier frequency or a bandwidth of a carrier frequency are used for each carrier frequency.

After the notification notifying that a transmission frequency resource of the first device changes is received by using the at least one communications interface, a transmission capability of the first user equipment needs to be fed back to the first device.

Specifically, the first device is notified that the first user equipment can support transmission on a transmission frequency resource indicated by the first device; or the first device is notified that the first user equipment can partially support transmission on a transmission frequency resource indicated by the first device, where the first user equipment may indicate a position of a transmission frequency resource and a size of the resource that can be supported by the first user equipment; or the first device is notified that the first user equipment cannot support transmission on a transmission frequency resource indicated by the first device.

Figure 15:
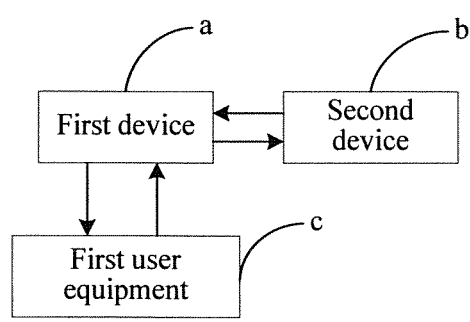
FIG. 15 is a schematic structural diagram of a system for flexibly adjusting a guard frequency band based on a synchronization relationship between devices according to an embodiment of the present invention.

An embodiment of the present invention provides an interference coordination system. Referring to FIG. 15, the interference coordination system includes: a first device a, a second device b, and a first user equipment c.

The first device a is a first device in the embodiment corresponding to FIG. 9; the second device b is a second device in the embodiment corresponding to FIG. 10; and the first user equipment c is any first user equipment in the embodiment corresponding to FIG. 11.

Alternatively, the first device a is a first device in the embodiment corresponding to FIG. 12; the second device b is a second device in the embodiment corresponding to FIG. 13; and the first user equipment c is any first user equipment in the embodiment corresponding to FIG. 14.

The first device a is configured to: when the first device is not synchronous with the second device, notify the second device b that the first device a is not in time synchronization with the second device b, and the first device a has configured a frequency resource close to an edge of a frequency band, where the frequency resource is used to transmit data.

The second device b is configured to notify the first device a that the second device b has a capability of configuring, according to the frequency resource configured by the first device, a frequency resource used to transmit data by the second device b.

The first device a is configured to send information, to notify the first user equipment c that a transmission frequency resource of the first device a changes, where the transmission frequency resource includes: a center frequency of each carrier frequency, a bandwidth of a carrier frequency, and a quantity of carrier frequencies in carrier aggregation; or one or more of a predefined center frequency of a carrier frequency or a bandwidth of a carrier frequency are used.

The first user equipment c is configured to: after the notification notifying that the transmission frequency resource of the first device a changes is received, need to feed back the transmission capability of the first user equipment to the first device a.

The information includes: notifying the first device a that the first user equipment c can support transmission on a transmission frequency resource indicated by the first device a; or notifying the first device a that the first user equipment c can partially support transmission on a transmission frequency resource indicated by the first device a; or notifying the first device a that the first user equipment c cannot support transmission on a transmission frequency resource indicated by the first device.

The embodiments of the present invention provide a solution to effectively utilize synchronization to reduce frequency guard space. Advantages of the present invention are: First, an operator may autonomously select, according to respective technical levels, whether to synchronize with a neighboring network and reduce frequency guard space. Next, an operator may locally and flexibly select, according to an interference condition, whether to reduce frequency guard space. Third, the "obedience" problem between operators can be easily resolved, and complex communication and coordination between the operators are not required. Therefore, a system can be provided with more spectrums, thereby improving a system capacity.

In summary, the advantages of this solution are:

An operator may autonomously select, according to respective technical levels, whether to synchronize with a neighboring network and reduce frequency guard space.

An operator may locally and flexibly select, according to an interference condition, whether to reduce frequency guard space.

The "obedience" problem between operators can be easily resolved, and complex communication and coordination between the operators are not required.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for configuring a position of a frequency resource, the method comprising:
  acquiring, by a first device, synchronization information of a second device, wherein the synchronization information of the second device includes indication information for at least one of the following synchronization statuses:
    whether the second device is synchronous with a preset time,
    whether clock synchronization of the second device is directly from clock synchronization of a wired network,
    whether a level of clock synchronization of the second device is less than a set threshold, or
    whether precision of clock synchronization of the second device is greater than a set threshold;
  configuring, by the first device according to the synchronization information of the second device, a position of a frequency resource used to transmit data; and
  communicating, by the first device, with a first user equipment according to the position of the frequency resource used to transmit data;
  wherein the second device communicates with a second user equipment;
  wherein when uplink-to-downlink interference exists between any first user equipment and any second user equipment, a maximum level of spurious emission inside a measurement bandwidth at an edge of a frequency band of a first device meeting a coexistence requirement is $L_a$;
  wherein a maximum level of spurious emission of a signal of the first device is $L_1$, and $L_1$ is greater than $L_a$;
  wherein:
    the level of spurious emission corresponds to spurious emission measured inside the measurement bandwidth at the edge of the frequency band of the first device; or
    the level of spurious emission corresponds to spurious emission measured inside a measurement bandwidth at an edge of a frequency band, of the second device, adjacent to the frequency band of the first device; or
    the level of spurious emission corresponds to spurious emission measured inside a measurement bandwidth across the edge of the frequency band of the first device and an edge of a frequency band of the second device.

2. The method according to claim 1, wherein:
  at least one of the first device or the second device uses a time division duplex technology; and
  frequency bands of the first device and the second device are adjacent.

3. The method according to claim 1, further comprising:
  determining, by the first device, a synchronization status between the first device and the second device according to the synchronization information of the second device.

4. A method for configuring a position of a frequency resource, the method comprising:
  acquiring, by a first device, synchronization information of a second device, wherein the synchronization information of the second device includes indication information for at least one of the following synchronization statuses:
    whether the second device is synchronous with a preset time,
    whether clock synchronization of the second device is reliable,
    whether clock synchronization of the second device is directly from clock synchronization of a wired network,
    whether clock synchronization of the second device is from reliable network listening,
    whether a level of clock synchronization of the second device is less than a set threshold, or
    whether precision of clock synchronization of the second device is greater than a set threshold;
  configuring, by the first device according to the synchronization information of the second device, a position of a frequency resource used to transmit data;
  communicating, by the first device, with a first user equipment according to the position of the frequency resource used to transmit data; and
  configuring, by the first device, a frequency resource of an edge of a frequency band;
  wherein at least one of the first device or the second device uses a time division duplex technology;
  wherein frequency bands of the first device and the second device are adjacent;
  wherein when the first device is synchronous with the second device, a frequency at a boundary between the frequency bands of the first device and the second device is $F_B$, a frequency $F_1$ is a frequency raster closest to $F_B$ in the frequency resource, and a frequency distance to $F_B$ is $G_1=|F_a-F_B|$;
  wherein the second device communicates with a second user equipment, and when uplink-to-downlink interference exists between any first user equipment and any second user equipment, a frequency $F_a$ is a frequency raster, closest to $F_B$, in the frequency resource, and a frequency distance to $F_B$ is $G_a=|F_a-F_B|$; and
  wherein a value of $F_1$ makes $G_1$ meet a condition $G_1<G_a$.

5. A method for configuring a position of a frequency resource, the method comprising:
  acquiring, by a first device, synchronization information of a second device, wherein the synchronization information of the second device includes indication information for at least one of the following synchronization statuses:
    whether the second device is synchronous with a preset time,
    whether clock synchronization of the second device is reliable,
    whether clock synchronization of the second device is directly from clock synchronization of a wired network,
    whether clock synchronization of the second device is from reliable network listening,
    whether a level of clock synchronization of the second device is less than a set threshold, or
    whether precision of clock synchronization of the second device is greater than a set threshold;
  configuring, by the first device according to the synchronization information of the second device, a position of a frequency resource used to transmit data;

communicating, by the first device, with a first user equipment according to the position of the frequency resource used to transmit data; and configuring, by the first device, a frequency resource close to an edge of a frequency band;

wherein when the first device is not synchronous with the second device, and when the second device can configure, according to the frequency resource configured by the first device, a frequency resource used to transmit data by the second device, a frequency at a boundary between frequency bands of the first device and the second device is $F_B$, a frequency $F_1$ is a frequency raster, closest to $F_B$, in the frequency resource that is configured by the first device and that is used to transmit data, and a frequency distance to $F_B$ is $G_1=|F_1-F_B|$;

wherein the second device communicates with a second user equipment, and when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and wherein a value of $F_1$ makes $G_1$ meet a condition $G_1<G_a$.

6. The method according to claim 5, wherein a frequency $F_2$ is a frequency raster, closest to $F_B$, in the frequency resource that is configured by the second device and that is used to transmit data, and a frequency distance to $F_B$ is $G_2=|F_2-F_B|$;

wherein when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$; and wherein a value of $F_2$ makes $G_2$ meet a condition $G_2>G_{a2}$.

7. The method according to claim 6, wherein when uplink-to-downlink interference exists between any first user equipment and any second user equipment, a maximum level of spurious emission inside a measurement bandwidth at an edge of a frequency band of a first device meeting a coexistence requirement is $L_{a2}$;

wherein a maximum level of spurious emission of a signal of the second device is $L_2$, and $L_2$ is less than $L_{a2}$; and wherein:
the level of spurious emission corresponds to spurious emission measured inside a measurement bandwidth at an edge of a frequency band of the second device; or the level of spurious emission corresponds to spurious emission measured inside a measurement bandwidth at an edge of a frequency band, of the second device, adjacent to the frequency band of the first device; or the level of spurious emission corresponds to spurious emission measured inside a measurement bandwidth across the edge of the frequency band of the first device and an edge of a frequency band of the second device; or when a resolution bandwidth is less than a measurement bandwidth, the level of spurious emission corresponds to a result of accumulation, inside the measurement bandwidth, of measured values inside the resolution bandwidth.

8. A first device, comprising:
a memory; and
a processor in communication with the memory, wherein the processor is configured to:

acquire synchronization information of a second device, wherein the synchronization information of the second device includes indication information for at least one of the following synchronization statuses:
whether the second device is synchronous with a preset time,
whether clock synchronization of the second device is directly from clock synchronization of a wired network,
whether a level of clock synchronization of the second device is less than a set threshold, or
whether precision of clock synchronization of the second device is greater than a set threshold;

determine a synchronization status between the first device and the second device according to the synchronization information of the second device, adjust a synchronization relationship between the first device and the second device, and set a synchronization status of the first device;

configure a frequency resource close to an edge of a frequency band according to the synchronization information of the second device, wherein the frequency resource is used to transmit data;

schedule and use the configured frequency resource to transmit data;

notify a first user equipment that a transmission frequency resource of the first device changes;

receive feedback information of the first user equipment, wherein the feedback information is a fed-back receiving capability of the first user equipment; and when the first device is not synchronous with the second device, notify the second device that the first device is not in time synchronization with the second device, and the first device has configured the frequency resource close to the edge of the frequency band;

wherein the first user equipment and a second user equipment communicate with the first device and the second device respectively, and when uplink-to-downlink interference exists between any first user equipment and any second user equipment, a maximum level of spurious emission inside a measurement bandwidth at an edge of a frequency band of a first device meeting a coexistence requirement is $L_a$;

wherein a maximum level of spurious emission of a signal of the first device is $L_1$, and $L_1$ is greater than $L_a$;

wherein:
the level of spurious emission corresponds to spurious emission measured inside the measurement bandwidth at the edge of the frequency band of the first device; or the level of spurious emission corresponds to spurious emission measured inside a measurement bandwidth at an edge of a frequency band, of the second device, adjacent to the frequency band of the first device; or the level of spurious emission corresponds to spurious emission measured inside a measurement bandwidth across the edge of the frequency band of the first device and an edge of a frequency band of the second device.

9. A first device, comprising:
a memory; and
a processor in communication with the memory, wherein the processor is configured to:
acquire synchronization information of a second device, wherein the synchronization information of the second device includes indication information for at least one of the following synchronization statuses:
whether the second device is synchronous with a preset time,
whether clock synchronization of the second device is reliable,
whether clock synchronization of the second device is directly from clock synchronization of a wired network,
whether clock synchronization of the second device is from reliable network listening,
whether a level of clock synchronization of the second device is less than a set threshold, or
whether precision of clock synchronization of the second device is greater than a set threshold;
determine a synchronization status between the first device and the second device according to the synchronization information of the second device, adjust a synchronization relationship between the first device and the second device, and set a synchronization status of the first device;
configure a frequency resource close to an edge of a frequency band according to the synchronization information of the second device, wherein the frequency resource is used to transmit data;
schedule and use the configured frequency resource to transmit data;
notify a first user equipment that a transmission frequency resource of the first device changes;
receive feedback information of the first user equipment, wherein the feedback information is a fed-back receiving capability of the first user equipment; and
when the first device is not synchronous with the second device, notify the second device that the first device is not in time synchronization with the second device, and the first device has configured the frequency resource close to the edge of the frequency band;
wherein when the first device is synchronous with the second device, a frequency at a boundary between frequency bands of the first device and the second device is $F_B$, a frequency $F_1$ is a frequency raster, closest to $F_B$, in the frequency resource that is configured by the first device and that is used to transmit data, and a frequency distance to $F_B$ is $G_1=|F_1-F_B|$,
wherein the first user equipment and a second user equipment communicate with the first device and the second device respectively, and when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and
wherein a value of $F_1$ makes $G_1$ meet a condition $G_1<G_a$.

10. A first device, comprising:
a memory; and
a processor in communication with the memory, wherein the processor is configured to:
acquire synchronization information of a second device, wherein the synchronization information of the second device includes indication information for at least one of the following synchronization statuses:
whether the second device is synchronous with a preset time,
whether clock synchronization of the second device is reliable,
whether clock synchronization of the second device is directly from clock synchronization of a wired network,
whether clock synchronization of the second device is from reliable network listening,
whether a level of clock synchronization of the second device is less than a set threshold, or
whether precision of clock synchronization of the second device is greater than a set threshold;
determine a synchronization status between the first device and the second device according to the synchronization information of the second device, adjust a synchronization relationship between the first device and the second device, and set a synchronization status of the first device;
configure a frequency resource close to an edge of a frequency band according to the synchronization information of the second device, wherein the frequency resource is used to transmit data;
schedule and use the configured frequency resource to transmit data;
notify a first user equipment that a transmission frequency resource of the first device changes;
receive feedback information of the first user equipment, wherein the feedback information is a fed-back receiving capability of the first user equipment; and
when the first device is not synchronous with the second device, notify the second device that the first device is not in time synchronization with the second device, and the first device has configured the frequency resource close to the edge of the frequency band;
wherein when the first device is not synchronous with the second device, and when the second device can configure, according to the frequency resource configured by the first device, a frequency resource used to transmit data by the second device, a frequency at a boundary between frequency bands of the first device and the second device is $F_B$, a frequency $F_1$ is a frequency raster, closest to $F_B$, in the frequency resource that is configured by the first device and that is used to transmit data, and a frequency distance to $F_B$ is $G_1=|F_1-F_B|$; and
wherein the first user equipment and a second user equipment communicate with the first device and the second device respectively, and when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and
wherein a value of $F_1$ makes $G_1$ meet a condition $G_1<G_a$.

11. A first device, comprising:
at least one processor, a memory configured to store program code, a communications interface, and a bus, wherein the at least one processor, the memory, and the communications interface are connected to and communicate with each other by using the bus; and
wherein the processor is configured to invoke the program code in the memory to:

acquire synchronization information of a second device by using at least one communications interface, wherein the synchronization information of the second device includes indication information for at least one of the following synchronization statuses:
- whether the second device is synchronous with a preset time,
- whether clock synchronization of the second device is directly from clock synchronization of a wired network,
- whether a level of clock synchronization of the second device is less than a set threshold, or
- whether precision of clock synchronization of the second device is greater than a set threshold;

configure a frequency resource close to an edge of a frequency band according to the synchronization information of the second device, wherein the frequency resource is used to transmit data;

schedule and use the at least one communications interface, and schedule and use the configured frequency resource to transmit data;

notify, by using the at least one communications interface, a first user equipment that a transmission frequency resource of the first device changes;

receive feedback information of the first user equipment by using the at least one communications interface, wherein the feedback information is a fed-back receiving capability of the first user equipment; and when the first device is not synchronous with the second device, notify, by using the at least one communications interface, the second device that the first device is not in time synchronization with the second device, and the first device has configured the frequency resource close to the edge of the frequency band;

wherein the first user equipment and a second user equipment communicate with the first device and the second device respectively, and when uplink-to-downlink interference exists between any first user equipment and any second user equipment, a maximum level of spurious emission inside a measurement bandwidth at an edge of a frequency band of a first device meeting a coexistence requirement is $L_a$;

wherein a maximum level of spurious emission of a signal of the first device is $L_1$, and $L_1$ is greater than $L_a$;

wherein:
- the level of spurious emission corresponds to spurious emission measured inside the measurement bandwidth at the edge of the frequency band of the first device; or
- the level of spurious emission corresponds to spurious emission measured inside a measurement bandwidth at an edge of a frequency band, of the second device, adjacent to the frequency band of the first device; or
- the level of spurious emission corresponds to spurious emission measured inside a measurement bandwidth across the edge of the frequency band of the first device and an edge of a frequency band of the second device.

12. The first device according to claim 11,
wherein when the first device is synchronous with the second device, a frequency at a boundary between frequency bands of the first device and the second device is $F_B$, a frequency $F_1$ is a frequency raster, closest to $F_B$, in the frequency resource that is configured by the first device and that is used to transmit data, and a frequency distance to $F_B$ is $G_1=|F_1-F_B|$;

wherein when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and wherein a value of $F_1$ makes $G_1$ meet a condition $G_1<G_a$.

13. The first device according to claim 11, wherein the processor is further configured to:
when the first device is not synchronous with the second device, and when the second device can configure, according to the frequency resource configured by the first device, a frequency resource used to transmit data by the second device, a frequency at a boundary between frequency bands of the first device and the second device is $F_B$, a frequency $F_1$ is a frequency raster, closest to $F_B$, in the frequency resource that is configured by the first device and that is used to transmit data, and a frequency distance to $F_B$ is $G_1=|F_1-F_B|$;

wherein when uplink-to-downlink interference exists between any first user equipment and any second user equipment, a frequency $F_a$ is a frequency raster, closest to $F_B$, in the frequency resource that is configured by the first device and that is used to transmit data, and a frequency distance to $F_B$ is $G_a=|F_a-F_B|$; and wherein a value of $F_1$ makes $G_1$ meet a condition $G_1<G_a$.

14. A second device, comprising:
at least one processor, a memory configured to store program code, a communications interface, and a bus, wherein the at least one processor, the memory, and the communications interface are connected to and communicate with each other by using the bus; and wherein the processor is configured to invoke the program code in the memory to:
notify, by using at least one communications interface, a first device that the second device has a capability of configuring, according to a frequency resource configured by the first device, a frequency resource used to transmit data by the second device, and sending, to the first device, synchronization information of the second device that includes indication information for at least one of the following synchronization statuses:
- whether the second device is synchronous with a preset time,
- whether clock synchronization of the second device is directly from clock synchronization of a wired network,
- whether a level of clock synchronization of the second device is less than a set threshold, or
- whether precision of clock synchronization of the second device is greater than a set threshold;

receive a notification from the first device by using the at least one communications interface, wherein the notification indicates that that the first device is not in time synchronization with the second device, and that the first device has configured a frequency resource close to an edge of a frequency band, wherein the frequency resource is used to transmit data; and after the notification of the first device is received, configure a frequency resource used to transmit data;

wherein a frequency at a boundary between frequency bands of the first device and the second device is $F_B$, a frequency $F_2$ is a frequency raster, closest to $F_B$, in a frequency resource that is configured by the second device and that is used to transmit data, and a frequency distance to $F_B$ is $G_2=|F_2-F_B|$;

wherein the first user equipment and a second user equipment communicate with the first device and the second device respectively, and when uplink-to-downlink interference exists between any first user equipment and any second user equipment, a frequency $F_{a2}$ is a frequency raster, closest to $F_B$, in the frequency resource that is configured by the second device and that is used to transmit data, and a frequency distance to $F_B$ is $G_{a2}=|F_{a2}-F_B|$; and wherein a value of $F_2$ makes $G_2$ meet a condition $G_2>G_{a2}$.

15. A second device, comprising:

at least one processor, a memory configured to store program code, a communications interface, and a bus, wherein the at least one processor, the memory, and the communications interface are connected to and communicate with each other by using the bus; and wherein the processor is configured to invoke the program code in the memory to:

notify, by using at least one communications interface, a first device that the second device has a capability of configuring, according to a frequency resource configured by the first device, a frequency resource used to transmit data by the second device, and sending, to the first device, synchronization information of the second device that includes indication information for at least one of the following synchronization statuses:

whether the second device is synchronous with a preset time, whether clock synchronization of the second device is directly from clock synchronization of a wired network, whether a level of clock synchronization of the second device is less than a set threshold, or whether precision of clock synchronization of the second device is greater than a set threshold;

receive a notification from the first device by using the at least one communications interface, wherein the notification indicates that that the first device is not in time synchronization with the second device, and that the first device has configured a frequency resource close to an edge of a frequency band, wherein the frequency resource is used to transmit data; and after the notification of the first device is received, configure a frequency resource used to transmit data;

wherein:

a maximum level of spurious emission of a signal of the second device is $L_2$, wherein a value of $L_2$ is $L_2<L_{a2}$, wherein $L_{a2}$ is, when uplink-to-downlink interference exists between any first user equipment and any second user equipment, a maximum level of spurious emission inside a measurement bandwidth at an edge of a frequency band of a first device meeting a coexistence requirement; or a level of spurious emission of a signal configured by the processor of the second device corresponds to spurious emission measured inside a measurement bandwidth at an edge of a frequency band of the second device; or a level of spurious emission corresponds to spurious emission measured inside a measurement bandwidth at an edge of a frequency band, of the second device, adjacent to the frequency band of the first device; or a level of spurious emission corresponds to is-spurious emission measured inside a measurement bandwidth across the edge of the frequency band of the first device and an edge of a frequency band of the second device; or when a resolution bandwidth is less than a measurement bandwidth, a level of spurious emission corresponds to a result of accumulation, inside the measurement bandwidth, of measured values inside the resolution bandwidth.

* * * * *

UNITED STATES PATENT AND TRADEMARK OFFICE
CERTIFICATE OF CORRECTION

PATENT NO. : 10,506,538 B2
APPLICATION NO. : 15/271018
DATED : December 10, 2019
INVENTOR(S) : Xizeng Dai et al.

Page 1 of 1

It is certified that error appears in the above-identified patent and that said Letters Patent is hereby corrected as shown below:

In the Claims

Claim 15, Column 60, Line 27: "a level of spurious emissions corresponds to is-spurious" should read -- a level of spurious emissions corresponds to spurious --.

Signed and Sealed this
Fourth Day of May, 2021

Drew Hirshfeld
*Performing the Functions and Duties of the
Under Secretary of Commerce for Intellectual Property and
Director of the United States Patent and Trademark Office*